(12) United States Patent
Kamimura et al.

(10) Patent No.: US 7,561,360 B2
(45) Date of Patent: Jul. 14, 2009

(54) MAGNETIC RECORDING MEDIUM

(75) Inventors: Takuya Kamimura, Kawasaki (JP);
Koji Matsumoto, Kawasaki (JP);
Takeshi Morikawa, Kawasaki (JP);
Shingo Hamaguchi, Kawasaki (JP);
Yukio Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 11/581,607

(22) Filed: Oct. 16, 2006

(65) Prior Publication Data
US 2007/0109678 A1    May 17, 2007

(30) Foreign Application Priority Data
Nov. 16, 2005   (JP)   ............... 2005-331499

(51) Int. Cl.
*G11B 5/09*   (2006.01)
(52) U.S. Cl. ....................................... 360/48
(58) Field of Classification Search ............. 360/77.02, 360/48, 77.08, 75, 132, 135; 428/826; 430/313; 359/344
See application file for complete search history.

(56) References Cited

U.S. PATENT DOCUMENTS

| | | | | |
|---|---|---|---|---|
| 5,568,311 A | * | 10/1996 | Matsumoto | ................. 359/344 |
| 6,420,058 B1 | | 7/2002 | Haratani et al. | |
| 6,753,130 B1 | * | 6/2004 | Liu et al. | .................... 430/313 |
| 6,852,431 B2 | * | 2/2005 | Fukutani et al. | ............. 428/826 |
| 7,271,984 B2 | | 9/2007 | Umeda et al. | |
| 2003/0113504 A1 | | 6/2003 | Kamimura et al. | |
| 2005/0128632 A1 | | 6/2005 | Nakamura et al. | |
| 2005/0219730 A1 | | 10/2005 | Sakurai et al. | |
| 2006/0198042 A1 | * | 9/2006 | Kaizu et al. | ............... 360/77.08 |
| 2006/0198052 A1 | * | 9/2006 | Soeno et al. | ................. 360/132 |
| 2006/0203368 A1 | * | 9/2006 | Kaizu et al. | .................... 360/48 |

FOREIGN PATENT DOCUMENTS

| | | |
|---|---|---|
| CN | 1591585 A | 3/2005 |
| CN | 1692419 A | 11/2005 |
| EP | 1 555 669 A1 | 7/2005 |
| EP | 1 755 118 A1 | 2/2007 |
| JP | 2005-017467 | 3/2005 |
| JP | 2005-166115 | 6/2005 |
| JP | 2005-293730 | 10/2005 |
| WO | WO 2005/106869 A1 | 11/2005 |

* cited by examiner

*Primary Examiner*—Fred Tzeng
(74) *Attorney, Agent, or Firm*—Fujitsu Patent Center

(57) ABSTRACT

A magnetic recording medium includes a substrate and a recording layer formed on the substrate. The recording layer is provided with a plurality of information tracks each having a track servo signal region and a user data region. Adjacent information tracks are separated by non-magnetic material. The track servo signal region includes a plurality of magnetic portions arranged in a track-extending direction and non-magnetic portions interposed between the magnetic portions. The user data region includes magnetic portions arranged in the track-extending direction. The coercive force of the magnetic portions in the track servo signal region is different from that of the magnetic portions in the user data region. For instance, the former coercive force is weaker than the latter coercive force.

16 Claims, 27 Drawing Sheets

MAGNETIC RECORDING MEDIUM

BACKGROUND OF THE INVENTION

1. Field of the Invention

The present invention relates to a magnetic recording medium known as a discrete track type.

2. Description of the Related Art

An example of recording mediums used for storage devices such as hard disk drives is a magnetic disk (a magnetic recording medium). A magnetic disk has a multilayer structure consisting of a disk substrate and a recording layer having a predetermined magnetic structure. The ongoing increase in amount of information that needs to be processed by a computer system is driving development of the magnetic disk for much higher recording density.

When recording information on the magnetic disk, a magnetic head for recording is disposed close to a recording surface (substantially a recording layer) of the magnetic disk, and the magnetic head applies to the recording layer a recording magnetic field stronger than the coercive force thereof. Sequentially reversing the direction of the recording magnetic field applied by the magnetic head while relatively moving the magnetic head with respect to the magnetic disk leads to formation of a plurality of recording marks (magnetic domains), alternately magnetized in opposite directions, aligned circumferentially of an information track or tracks in the recording layer of the disk. Controlling the timing to reverse the direction of the recording magnetic field during this process enables forming recording marks of predetermined lengths. Thus on the recording layer, signals or information is recorded based on the variation of the magnetizing direction.

In the field of the magnetic disk, a so-called discrete track (DT) type magnetic disk has been developed, for achieving higher recording density. DT type magnetic disks are described in Patent documents 1 to 3 below.

Patent document 1: JP-A-2005-71467
Patent document 2: JP-A-2005-166115
Patent document 3: JP-A-2005-293730

FIGS. 31 and 32 depict a conventional DT type magnetic disk 90. FIG. 31 is a fragmentary plan view of the magnetic disk 90, and FIG. 32 is a cross-sectional view taken along the line XXXII-XXXII in FIG. 31.

As shown in FIG. 32, the magnetic disk 90 has a multilayer structure including a disk substrate 91, a recording layer 92, and a cover layer 93. The recording layer 92 includes, as shown in FIG. 31, a plurality of information tracks 92A extending circumferentially of the disk D or winding around the center of the disk, and non-magnetic regions 92B located between the information tracks. The information track 92A includes a track servo signal region TS and a user data region YD. The track servo signal region TS includes a plurality of magnetic regions 92a and a plurality of non-magnetic regions 92b, such that the mutually adjacent magnetic regions 92a are isolated by the non-magnetic region 92b. The magnetic regions 92a respectively have what is known as perpendicular magnetic anisotropy, and are magnetized in the same direction. The magnetic regions 92a and the non-magnetic regions 92b thus configured constitute track servo information. The user data region YD includes a magnetic region 92c, where user data is to be written. The magnetic region 92c, which is made of the same material as that of the magnetic region 92a, has perpendicular magnetic anisotropy, and is in so-called an "as-depo" state in which the region is randomly and generally uniformly magnetized in a vertical direction, before the user data is first written thereon.

When recording information on the DT type magnetic disk 90, the magnetic head applies the recording magnetic field, thus to create a plurality of recording marks (magnetic domains), alternately magnetized in opposite directions, serially aligned circumferentially of the disk recording layer 92 on the magnetic region 92c in the user data region YD in one of the information tracks 92A. During this process, since the information track 92A to which the magnetic field is sequentially applied for recording information and the adjacent information track 92A are isolated by the non-magnetic region 92B, a cross-write effect, which erases or degrades the recording mark in the adjacent information track 92A, can be prevented. The capability of preventing the cross-write effect is an advantageous feature of the magnetic disk in achieving a finer pitch of the tracks and higher recording density.

FIGS. 33(a) to 34(c) depict a manufacturing method of the magnetic disk 90. To manufacture the magnetic disk 90, firstly a magnetic film 94 is formed on the disk substrate 91 as shown in FIG. 33(a). Then as shown in FIG. 33(b), a resist pattern 95 is formed on the magnetic film 94. The resist pattern 95 is provided with openings 95a located according to the pattern of the non-magnetic region 92b of the recording layer 92. The resist pattern 95 also includes openings (not shown) located according to the pattern of the non-magnetic region 92B of the recording layer 92. Proceeding to FIG. 33(c), an etching process is performed utilizing the resist pattern 95 as the mask, to thereby delineate the pattern on the magnetic film 94. At this stage, the magnetic regions 92a, 92c in the recording layer 92 are formed. After removal of the resist pattern 95, a non-magnetic material 96 is loaded among the magnetic regions 92a, 92c, as shown in FIG. 33(d). This process forms the non-magnetic regions 92B, 92b in the recording layer 92.

Proceeding to FIG. 34(a), the cover layer 93 is formed on the recording layer 92. Then as shown in FIG. 34(b), a magnetic field is collectively applied to the entire recording layer 92, so as to magnetize the magnetic regions 92a, 92c in the same direction. In this process, the magnetic field Hr applied to the magnetic regions 92a, 92c is stronger than the coercive force thereof. Magnetizing thus the magnetic regions 92a in the same direction permits formation of the track servo information in the track servo signal region TS. Referring now to FIG. 34(c), an AC erasion process is performed to bring the magnetic region 92c in the user data region YD into the as-depo state. In the AC erasion process, a predetermined magnetic head is employed so as to form a high-frequency repeating pattern mark in the magnetic region 92c of the user data region YD, in each information track 92A. Through such steps, the magnetic disk 90 including the track servo information in the recording layer 92 can be obtained.

The manufacturing of the conventional magnetic disk 90, however, involves inefficient steps. The manufacturing process of the conventional magnetic disk 90 requires once magnetizing the magnetic region 92a of the recording layer 92 in the same direction, and then performing the AC erasion process to turn only the magnetic regions 92c into the as-depo state. The AC erasion process has to be performed for each single information track 92A. Accordingly, the AC erasion process takes a long time (often 10 minutes or more per disk) in turning the magnetic region 92c in the information track 92A, hence all the magnetic regions 92c of the recording layer 92, into the as-depo state. Such AC erasion process is undesirable for achieving higher manufacturing efficiency and lower manufacturing cost of the magnetic disk.

SUMMARY OF THE INVENTION

The present invention has been proposed under the foregoing situation, with an object to provide a magnetic recording medium which is suitable for efficiently producing track servo information and efficiently making a magnetic region in a user data region into an as-depo state. Another object of the present invention is to provide a method of making such a magnetic recording medium.

A first aspect of the present invention provides a magnetic recording medium having a multilayer structure including a substrate and a recording layer, to be rotated in recording information. In the magnetic recording medium, the recording layer includes a plurality of information tracks extending in parallel around the rotation center of the rotating motion, each including a track servo signal region and a user data region, non-magnetic regions being interposed between the adjacent information tracks. The track servo signal region includes a plurality of first magnetic regions aligned in the track extending direction, and non-magnetic regions interposed between the adjacent first magnetic regions. The user data region includes a second magnetic region extending in the track extending direction. The first and the second magnetic regions have perpendicular magnetic anisotropy, and the second magnetic region has larger coercive force than that of the first magnetic region. The substrate in the present invention may be a bare substrate, or a substrate with a predetermined material layer formed on the surface thereof. The magnetic recording medium thus constructed is advantageous in efficiently forming track servo information and efficiently turning the magnetic region in the user data region into an as-depo state.

When manufacturing such magnetic recording medium, the first magnetic region in the track servo signal region and the second magnetic region in the user data region may be respectively brought into an as-depo state by a thin film formation technique, for example on the substrate. Thereafter, collectively applying to the entire recording layer a predetermined magnetic field, stronger than the coercive force of the first magnetic region but weaker than the coercive force of the second magnetic region, enables maintaining the as-depo state of the second magnetic region while magnetizing the first magnetic regions in the same direction. The application of such magnetic field results in formation of track servo information, including a plurality of first magnetic regions magnetized in the same direction and a plurality of non-magnetic regions, in the track servo signal region.

In the magnetic recording medium thus constructed, collectively applying the magnetic field to the entire recording layer enables magnetizing the first magnetic regions in the same direction in the track servo signal region, which facilitates efficiently forming the track servo information. Such process eliminates the need to employ a magnetic head or the like to individually apply a magnetic field to the first magnetic regions, for forming the track servo information. The magnetic recording medium also allows maintaining, even after the collective application of the magnetic field, the as-depo state of the second magnetic region, which is the initial state thereof, based on the difference in coercive force between the first and the second magnetic region. Therefore, the magnetic recording medium is free from the AC erasion process described referring to the conventional magnetic disk 90, for turning the second magnetic region in the user data region into the as-depo state. Thus, the proposed magnetic recording medium allows efficiently forming the track servo information, and efficiently bringing the magnetic region in the user data region into the as-depo state. Such magnetic recording medium facilitates improving the manufacturing efficiency and reducing the manufacturing cost.

In an exemplary embodiment of the first aspect of the present invention, a minutely rough structure layer may be interposed between the substrate and the second magnetic region. The surface roughness the surface for formation of the magnetic region has influence upon the coercive force of the magnetic region, such that the greater surface roughness of the magnetic region formation surface often grants the greater coercive force to the magnetic region formed thereon. Accordingly, forming the second magnetic region on a predetermined minutely rough structure layer and forming the first magnetic region, for example, directly on the substrate allows granting greater coercive force to the second magnetic region than to the first magnetic region.

In another exemplary embodiment of the first aspect of the present invention, the substrate may include a rough surface region, and the second magnetic region may be provided on the rough surface region. As already stated, the greater surface roughness of the magnetic region formation surface often grants the greater coercive force to the magnetic region formed thereon. Accordingly, forming the second magnetic region on a predetermined rough surface region and forming the first magnetic region on the substrate, for example in a region not subjected to the surface-roughening allows granting greater coercive force to the second magnetic region than to the first magnetic region.

A second aspect of the present invention provides a magnetic recording medium having a multilayer structure including a substrate and a recording layer, to be rotated in recording information. In the magnetic recording medium, the recording layer includes a plurality of information tracks extending in parallel around the rotation center of the rotating motion, each including a track servo signal region and a user data region, and non-magnetic regions interposed between the adjacent information tracks. The track servo signal region includes a plurality of first magnetic regions aligned in the track extending direction, and non-magnetic regions interposed between the adjacent first magnetic regions. The user data region includes a second magnetic region extending in the track extending direction. The first and the second magnetic region have perpendicular magnetic anisotropy, and the second magnetic region has larger coercive force than the first magnetic region. The magnetic recording medium thus constructed is advantageous in efficiently forming track servo information and efficiently turning the magnetic region in the user data region into an as-depo state.

When manufacturing such magnetic recording medium, collectively applying a predetermined magnetic field stronger than the coercive force of the first magnetic region to the entire recording layer, including the first magnetic region in the track servo signal region and the second magnetic region in the user data region, enables magnetizing the first magnetic region and the second magnetic region in the same direction. The application of such magnetic field results in formation of track servo information, including a plurality of first magnetic regions magnetized in the same direction and a plurality of non-magnetic regions, in the track servo signal region. Heating thereafter the entire medium at a predetermined temperature enables maintaining the magnetization direction of the first magnetic region having the greater coercive force, while thermally relaxing the second magnetic region having the smaller coercive force, to thereby turn the second magnetic region into the as-depo state.

In the magnetic recording medium thus constructed, collectively applying the magnetic field to the entire recording layer enables magnetizing the first magnetic regions in the same direction in the track servo signal region, which facilitates efficiently forming the track servo information. The magnetic recording medium also eliminates the need to perform the AC erasion process described referring to the conventional magnetic disk 90, for turning the second magnetic region in the user data region into the as-depo state. This is because heating the entire medium at a predetermined temperature enables maintaining the magnetization direction of the first magnetic region, while turning the second magnetic region into the as-depo state by thermal relaxation, based on the difference in coercive force between the first and the second magnetic region. Thus, the proposed magnetic recording medium allows efficiently forming the track servo information, and efficiently bringing the magnetic region in the user data region into the as-depo state. Such magnetic recording medium facilitates improving the manufacturing efficiency and reducing the manufacturing cost.

In an exemplary embodiment of the second aspect of the present invention, the minutely rough structure layer may be interposed between the substrate and the first magnetic region. As already stated, the greater surface roughness of the magnetic region formation surface often grants the greater coercive force to the magnetic region formed thereon. Accordingly, forming the first magnetic region on the predetermined minutely rough structure layer and forming the second magnetic region, for example, directly on the substrate allows granting greater coercive force to the first magnetic region than to the second magnetic region.

In another exemplary embodiment of the second aspect of the present invention, the substrate may include a rough surface region, and the first magnetic region may be provided on the rough surface region. As already stated, the greater surface roughness of the magnetic region formation surface often grants the greater coercive force to the magnetic region formed thereon. Accordingly, forming the first magnetic region on the predetermined rough surface region and forming the second magnetic region on the substrate, for, example in a region not subjected to the surface-roughening allows granting greater coercive force to the first magnetic region than to the second magnetic region.

Preferably, the sidewall of the first magnetic region may be roughened. Such structure is advantageous in granting greater coercive force to the first magnetic region than to the second magnetic region.

A third aspect of the present invention provides a magnetic recording medium having a multilayer structure including a substrate and a recording layer, to be rotated when recording information. In the magnetic recording medium, the recording layer includes a plurality of information tracks extending in parallel around the rotation center of the rotating motion, each including a track servo signal region and a user data region, and non-magnetic regions interposed between the adjacent information tracks. The track servo signal region includes a plurality of first magnetic regions aligned in the track extending direction, and non-magnetic regions interposed between the adjacent first magnetic regions. The user data region includes a second magnetic region extending in the track extending direction. The first and the second magnetic region have perpendicular magnetic anisotropy, and a minutely rough structure layer is interposed between the substrate and one of the first magnetic region and the second magnetic region.

As already stated, the greater surface roughness of the magnetic region formation surface often grants the greater coercive force to the magnetic region formed thereon. Therefore, in the magnetic recording medium according to the third aspect of the present invention, forming the first magnetic region on the predetermined minutely rough structure layer and forming the second magnetic region, for example, directly on the substrate allows granting greater coercive force to the first magnetic region than to the second magnetic region. Alternatively, forming the second magnetic region on the predetermined minutely rough structure layer and forming the first magnetic region, for example, directly on the substrate allows granting greater coercive force to the second magnetic region than to the first magnetic region. Thus, the proposed magnetic recording medium allows, as described referring to the magnetic recording medium according to the first and the second aspect, efficiently forming the track servo information, and efficiently bringing the magnetic region in the user data region into the as-depo state.

A fourth aspect of the present invention provides a magnetic recording medium having a multilayer structure including a substrate and a recording layer, to be rotated when recording information. In the magnetic recording medium, the substrate includes a rough surface region. The recording layer includes a plurality of information tracks extending in parallel around the rotation center of the rotating motion, each including a track servo signal region and a user data region, and non-magnetic regions interposed between the adjacent information tracks. The track servo signal region includes a plurality of first magnetic regions aligned in the track extending direction, and non-magnetic regions interposed between the adjacent first magnetic regions. The user data region includes a second magnetic region extending in the track extending direction. The first and the second magnetic region have perpendicular magnetic anisotropy, and one of the first magnetic region and the second magnetic region is provided on the rough surface region of the substrate.

As already stated, the greater surface roughness of the magnetic region formation surface often grants the greater coercive force to the magnetic region formed thereon. Therefore, in the magnetic recording medium according to the fourth aspect of the present invention, forming the first magnetic region on the predetermined minutely rough structure layer and forming the second magnetic region, for example, on a region not subjected to the surface roughening allows granting greater coercive force to the first magnetic region than to the second magnetic region. Alternatively, forming the second magnetic region on the predetermined minutely rough structure layer and forming the first magnetic region, for example, on a region not subjected to the surface roughening allows granting greater coercive force to the second magnetic region than to the first magnetic region. The magnetic recording medium thus constructed allows, as described referring to the magnetic recording medium according to the first and the second aspect, efficiently forming the track servo information, and efficiently bringing the magnetic region in the user data region into the as-depo state.

A fifth aspect of the present invention provides a magnetic recording medium having a multilayer structure including a substrate and a recording layer, to be rotated when recording information. In the magnetic recording medium, the recording layer includes a plurality of information tracks extending in parallel around the rotation center of the rotating motion, each including a track servo signal region and a user data region, and non-magnetic regions interposed between the adjacent information tracks. The track servo signal region includes a plurality of first magnetic regions aligned in the track extending direction, and non-magnetic regions interposed between the adjacent first magnetic regions. The user data region includes a second magnetic region extending in the track extending direction. The first and the second magnetic region have perpendicular magnetic anisotropy, and the first magnetic region includes a roughened sidewall. The magnetic recording medium thus constructed allows granting greater coercive force to the first magnetic region than to the second magnetic region. Such magnetic recording medium therefore allows, as described referring to the magnetic recording medium according to the second aspect, efficiently forming the track servo information, and efficiently bringing the magnetic region in the user data region into the as-depo state.

A sixth aspect of the present invention provides a magnetic recording medium having a multilayer structure including a substrate and a recording layer, to be rotated when recording information. In the magnetic recording medium, the recording layer includes a plurality of information tracks extending in parallel around the rotation center of the rotating motion, each including a track servo signal region and a user data region, and non-magnetic regions interposed between the adjacent information tracks. The track servo signal region includes a plurality of first magnetic regions aligned in the track extending direction, and non-magnetic regions interposed between the adjacent first magnetic regions. The user data region includes a second magnetic region extending in the track extending direction. The first and the second magnetic region have perpendicular magnetic anisotropy, and a portion (first portion) to which the first magnetic region is joined on the side of the substrate has higher heat dissipation efficiency than a portion to which the second magnetic region is joined on the side of the substrate (second portion).

In the magnetic recording medium thus constructed, a heat dissipation layer is interposed, for example between the substrate and the first magnetic region. Alternatively, a first heat dissipation layer may be interposed between the substrate and the first magnetic region, and a second heat dissipation layer may be interposed between the substrate and the second magnetic region. The first heat dissipation layer may have higher thermal conductivity than the second heat dissipation layer. Otherwise, the first heat dissipation layer may be interposed between the substrate and the first magnetic region, and a second heat dissipation layer may be interposed between the substrate and the second magnetic region, and the first heat dissipation layer may be thicker than the second heat dissipation layer. Such configurations are preferable in granting higher thermal conductivity to the first portion to which the first magnetic region is joined on the side of the substrate than to the second portion to which the second magnetic region is joined on the side of the substrate.

When manufacturing such magnetic recording medium, collectively applying a predetermined magnetic field stronger than the coercive force of the first magnetic region to the entire recording layer, including the first magnetic region in the track servo signal region and the second magnetic region in the user data region, enables magnetizing the first magnetic region and the second magnetic region in the same direction. The application of such magnetic field results in formation of the track servo information, including a plurality of first magnetic regions magnetized in the same direction and a plurality of non-magnetic regions, in the track servo signal region. Employing thereafter a bulk laser for a photomagnetic recording medium, so as to irradiate the recording layer from the opposite direction to the substrate, with a laser beam having a diameter that covers a plurality of information tracks at a predetermined power, enables maintaining the magnetization direction of the first magnetic region, while turning the second magnetic region into the as-depo state by thermal relaxation, even when the first and the second magnetic region are made of a same magnetic material.

When the first and the second magnetic region are made of the same magnetic material in the magnetic recording medium, the first and the second magnetic region have substantially the same coercive force, under a same temperature. In the proposed magnetic recording medium, however, since the first portion to which the first magnetic region is joined on the side of the substrate has higher heat dissipation efficiency than the second portion to which the second magnetic region is joined on the side of the substrate, when the recording layer is irradiated with the laser from the opposite direction to the substrate the second magnetic region in the irradiated region gains a higher temperature than the first magnetic region in the irradiated region, because of the difference in heat dissipation efficiency or heat diffusing performance between the first and the second portions. The difference in temperature increase, in turn, makes the coercive force of the second magnetic region in the irradiated region smaller than that of the first magnetic region in the irradiated region (coercive force of a magnetic material generally drops when the temperature increases). Therefore, the laser irradiation enables maintaining the magnetization direction of the first magnetic region of the lower temperature and having the greater coercive force, while turning the second magnetic region, of the higher temperature and having the smaller coercive force, into the as-depo state by thermal relaxation, in the irradiated region.

In the proposed magnetic recording medium, collectively applying the magnetic field to the entire recording layer enables magnetizing the first magnetic regions in the same direction in the track servo signal region, which facilitates efficiently forming the track servo information. The magnetic recording medium also eliminates the need to perform the AC erasure process described referring to the conventional magnetic disk 90, for turning the second magnetic region in the user data region into the as-depo state. This is because irradiating the recording layer with the laser from the opposite direction to the substrate enables maintaining the magnetization direction of the first magnetic region, while turning the second magnetic region into the as-depo state by thermal relaxation, based on the difference in heat dissipation efficiency or heat diffusing performance between the first and the second portions. Thus, the proposed magnetic recording medium allows efficiently forming the track servo information, and efficiently bringing the magnetic region in the user data region into the as-depo state. Such magnetic recording medium facilitates improving the manufacturing efficiency and reducing the manufacturing cost.

In the first to the sixth aspect of the present invention, it is preferable that the first magnetic region and the second magnetic region are made of a magnetic material of a same composition. The present invention does not require that the first magnetic region and the second magnetic region should be made of different magnetic materials.

A seventh aspect of the present invention provides a method of manufacturing a magnetic recording medium. The method includes collectively applying to the first and the second magnetic region of the magnetic recording medium according to the first aspect, a magnetic field stronger than a coercive force of the first magnetic region but weaker than a coercive force of the second magnetic region, thereby magnetizing the first magnetic regions in the same direction. Such method allows, as described referring to the magnetic recording medium according to the first aspect, efficiently forming the track servo information and efficiently bringing the magnetic region in the user data region into the as-depo state.

An eighth aspect of the present invention provides a method of manufacturing a magnetic recording medium. The method includes collectively applying a magnetic field stronger than a coercive force of the first magnetic region to the first and the second magnetic region of the magnetic recording medium according to the second or the fifth aspect, thereby magnetizing the first magnetic region and the second magnetic region in the same direction, and thermally relaxing the second magnetic region by heating. Such method allows, as described referring to the magnetic recording medium according to the second aspect, efficiently forming the track servo information and efficiently bringing the magnetic region in the user data region into the as-depo state.

A ninth aspect of the present invention provides a method of manufacturing a magnetic recording medium. The method includes collectively applying a magnetic field to the first and the second magnetic region of the magnetic recording medium according to the sixth aspect, thereby magnetizing the first magnetic region and the second magnetic region in the same direction, and irradiating the recording layer with a laser from an opposite direction to the substrate, thus thermally relaxing the second magnetic region. Such method allows, as described referring to the magnetic recording medium according to the sixth aspect, efficiently forming the track servo information and efficiently bringing the magnetic region in the user data region into the as-depo state.

DETAILED DESCRIPTION OF THE PREFERRED EMBODIMETNS

Figure 1:
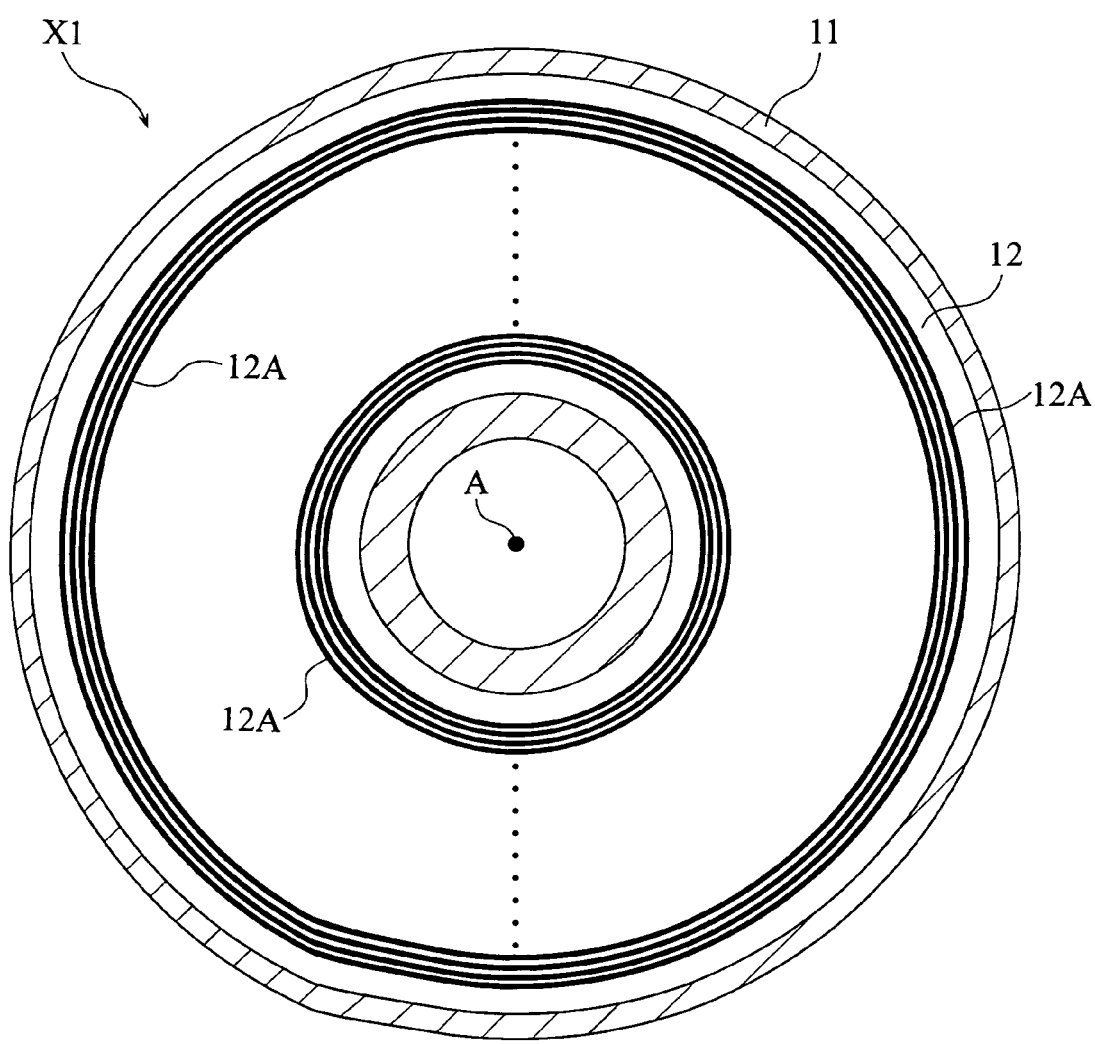
FIG. 1 is a plan view showing a magnetic disk according to a first embodiment of the present invention.
Figure 2:
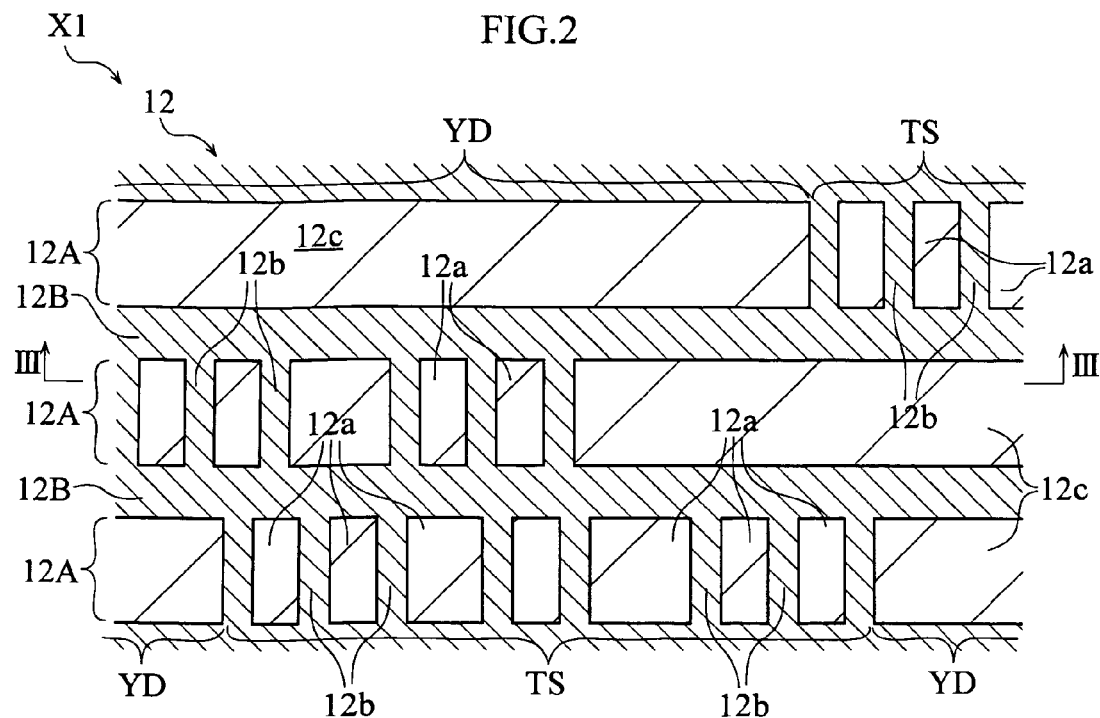
FIG. 2 is an enlarged fragmentary plan view of the magnetic disk shown in FIG. 1.
Figure 3:
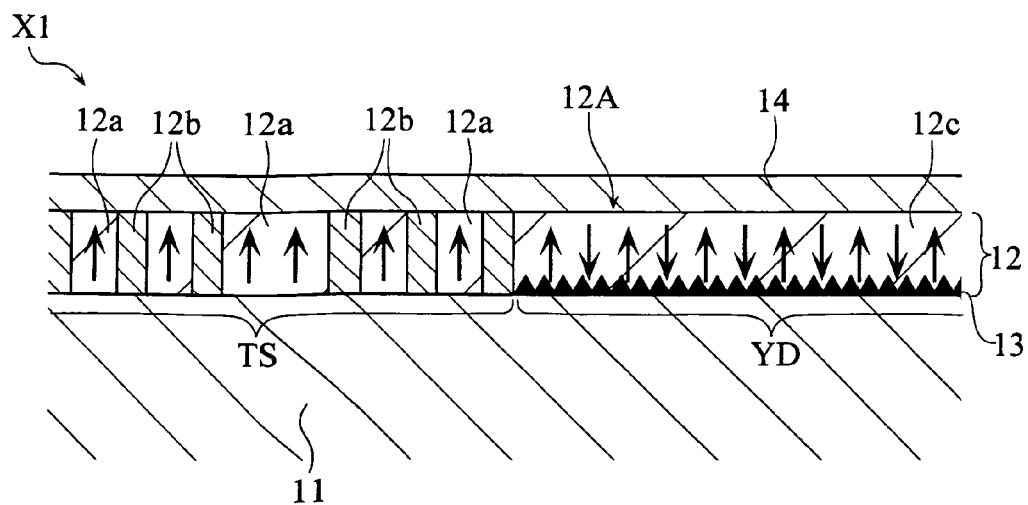
FIG. 3 is a cross-sectional view taken along the line III-III in FIG. 2.

FIGS. 1 to 3 depict a DT type magnetic disk X1 according to a first embodiment of the present invention. FIG. 1 is a plan view of the magnetic disk X1, and FIG. 2 is an enlarged fragmentary plan view of the magnetic disk X1 shown in FIG. 1. FIG. 3 is a cross-sectional view taken along the line III-III in FIG. 2.

The magnetic disk X1 has a multilayer structure including a disk substrate 11, a recording layer 12, a minutely rough structure layer 13 (not shown in FIGS. 1 and 2), and a cover layer 14 (not shown in FIGS. 1 and 2), and constitutes a magnetic recording medium capable of recording and reproducing information based on a heat-assisted magnetic recording system.

The disk substrate 11 primarily serves to secure sufficient rigidity of the magnetic disk X1, and may be made of an aluminum alloy, glass, silicon, or a polycarbonate resin.

The recording layer 12 includes a plurality of information tracks 12A and a plurality of non-magnetic regions 12B, as shown in FIG. 2. The information tracks 12A, a part of which is schematically indicated by bold lines in FIG. 1, are concentrically disposed on the disk substrate 11 around the rotation center of the magnetic disk X1. The information tracks 12A, a part of which is shown in FIG. 2, are respectively divided into a plurality of track servo signal regions Ts and a plurality of user data regions YD. The track servo signal regions TS respectively include a plurality of magnetic regions 12a and a plurality of non-magnetic regions 12b, such that the adjacent magnetic regions 12a are isolated from each other by the non-magnetic region 12b. The magnetic regions 12a respectively have what is known as perpendicular magnetic anisotropy, and are magnetized in the same direction. The coercive force $Hc_1$ of the magnetic region 12a is, for instance, 3 to 5 kOe in room temperature. The magnetic region 12a may be made of $CoCrPt$—$SiO_2$. The non-magnetic region 12b may be made of a non-magnetic material such as SiN, C, $SiO_2$. The magnetic regions 12a and the non-magnetic regions 12b in the track servo signal region TS constitute track servo information. The user data region YD includes a magnetic region 12c, where user data is to be written, extending along the extending direction of the information track 12A. The magnetic region 12c is made of the same material as the magnetic region 12a having the perpendicular magnetic anisotropy, and is in so-called an "as-depo" state in which the region is randomly and generally uniformly magnetized in a vertical direction, before the user data is first written thereon. The coercive force $Hc_2$ of the magnetic region 12c is for instance 4 to 6 kOe in room temperature, but greater than the coercive force $Hc_1$ of the magnetic region 12a. The non-magnetic regions 12B are interposed among the information tracks 12A, and made of the same non-magnetic material of the non-magnetic region 12b. The recording layer 12 thus configured has a thickness of 10 to 20 nm, for instance.

The minutely rough structure layer 13 serves to increase the coercive force of the magnetic region 12c in the user data region YD of the information track 12A, and is located in a region on the disk substrate 11 at least corresponding to the user data region YD, except a region corresponding to the track servo signal region TS of the recording layer 12 (for example, all over the disk substrate 11 except the region corresponding to the track servo signal region TS of the recording layer 12). The minutely rough structure layer 13 has, on the surface opposing the recording layer 12, a minutely rough structure that applies a pinning effect of increasing the pinning force of the magnetic region 12c in the user data region YD, and thus enhancing the effective coercive force. The surface of the minutely rough structure layer 13 opposing the recording layer 12 has a surface roughness Ra of for instance 0.5 to 2 nm, and an average diameter (average particle size) of a protruding portion (grown particle) of the rough structure is 5 to 10 nm, for instance. Suitable materials of the minutely rough structure layer 13 include Pt, Au, Pd, Ru, and Co. The minutely rough structure layer 13 thus constructed has a thickness of, for instance, 3 to 10 nm.

Figure 4:
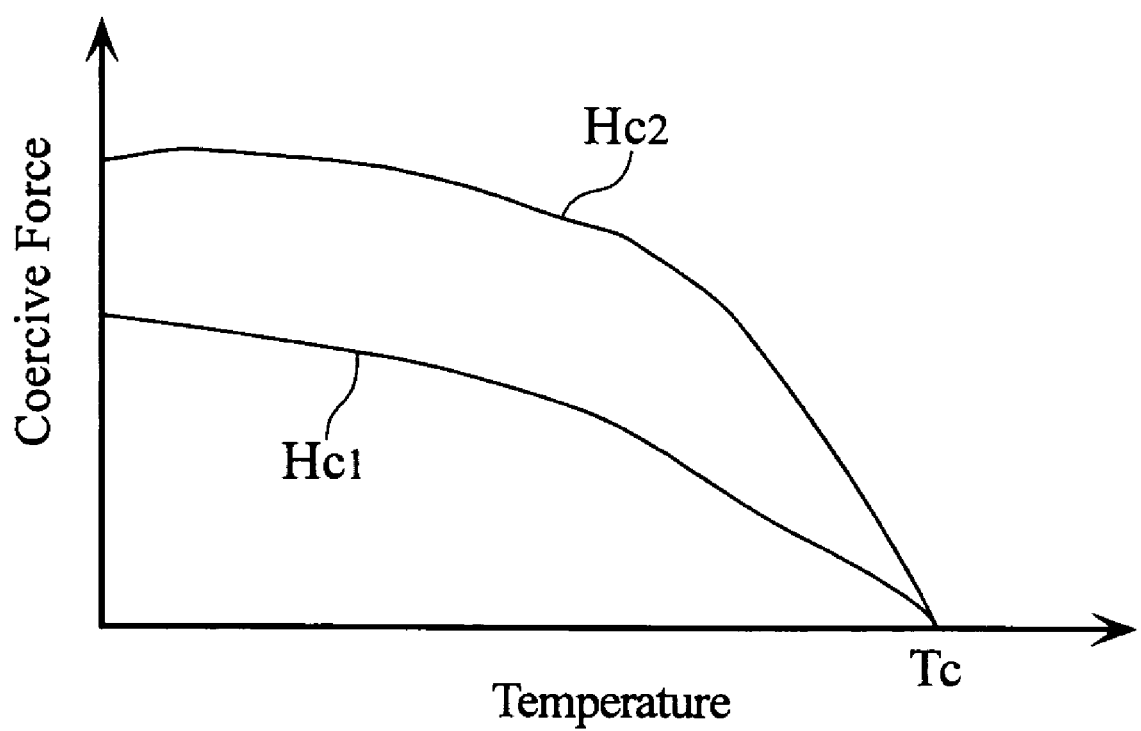
FIG. 4 is a graph showing a temperature dependence of coercive force of a first magnetic region and that of a second magnetic region of the magnetic disk according to the first embodiment.
Figure 5:
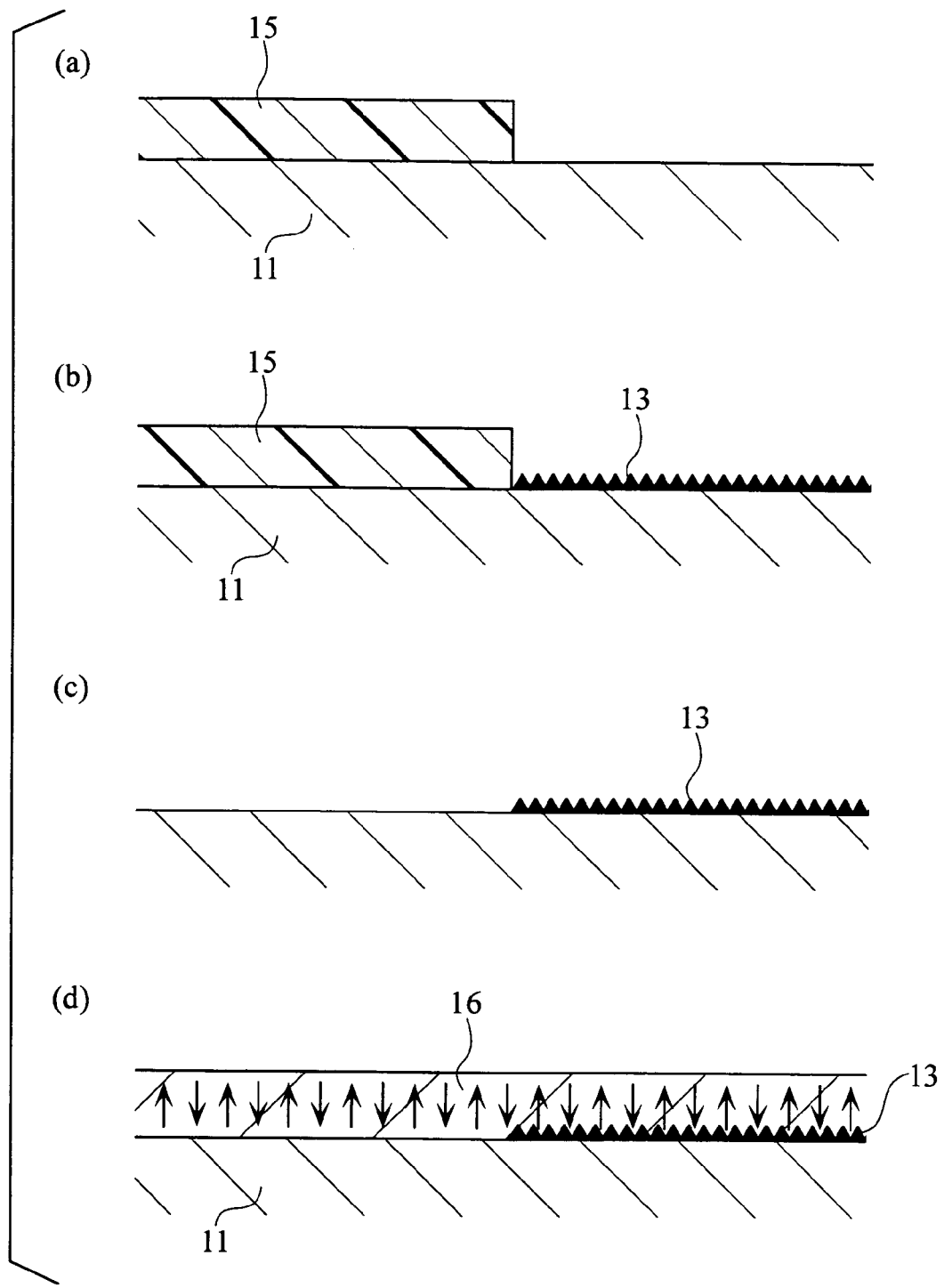
FIGS. 5(a) to 5(d) are cross-sectional views progressively showing a manufacturing process of the magnetic disk according to the first embodiment.
Figure 6:
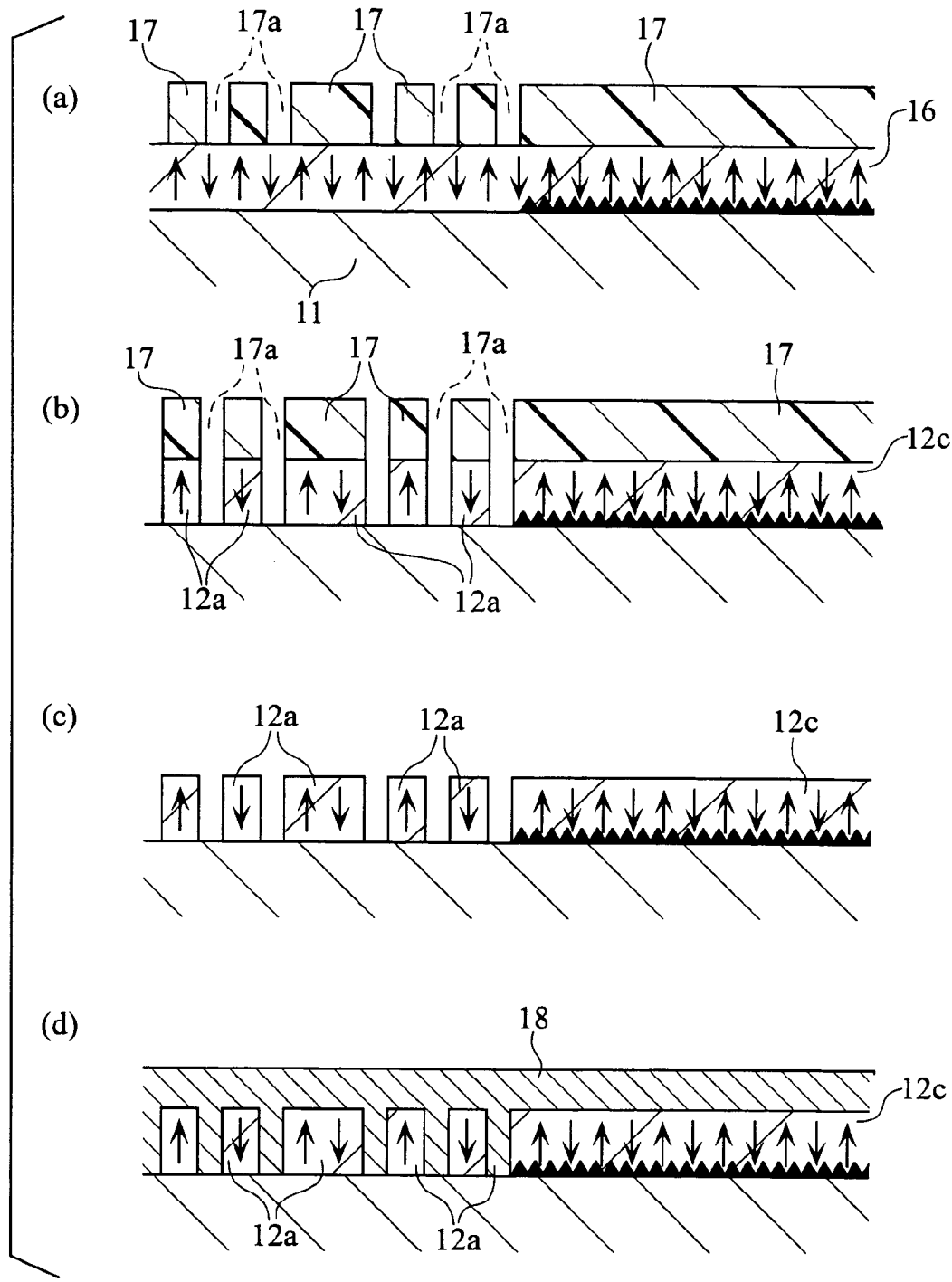
FIGS. 6(a) to 6(d) are cross-sectional views showing the manufacturing process subsequent to FIG. 5(d)
Figure 7:
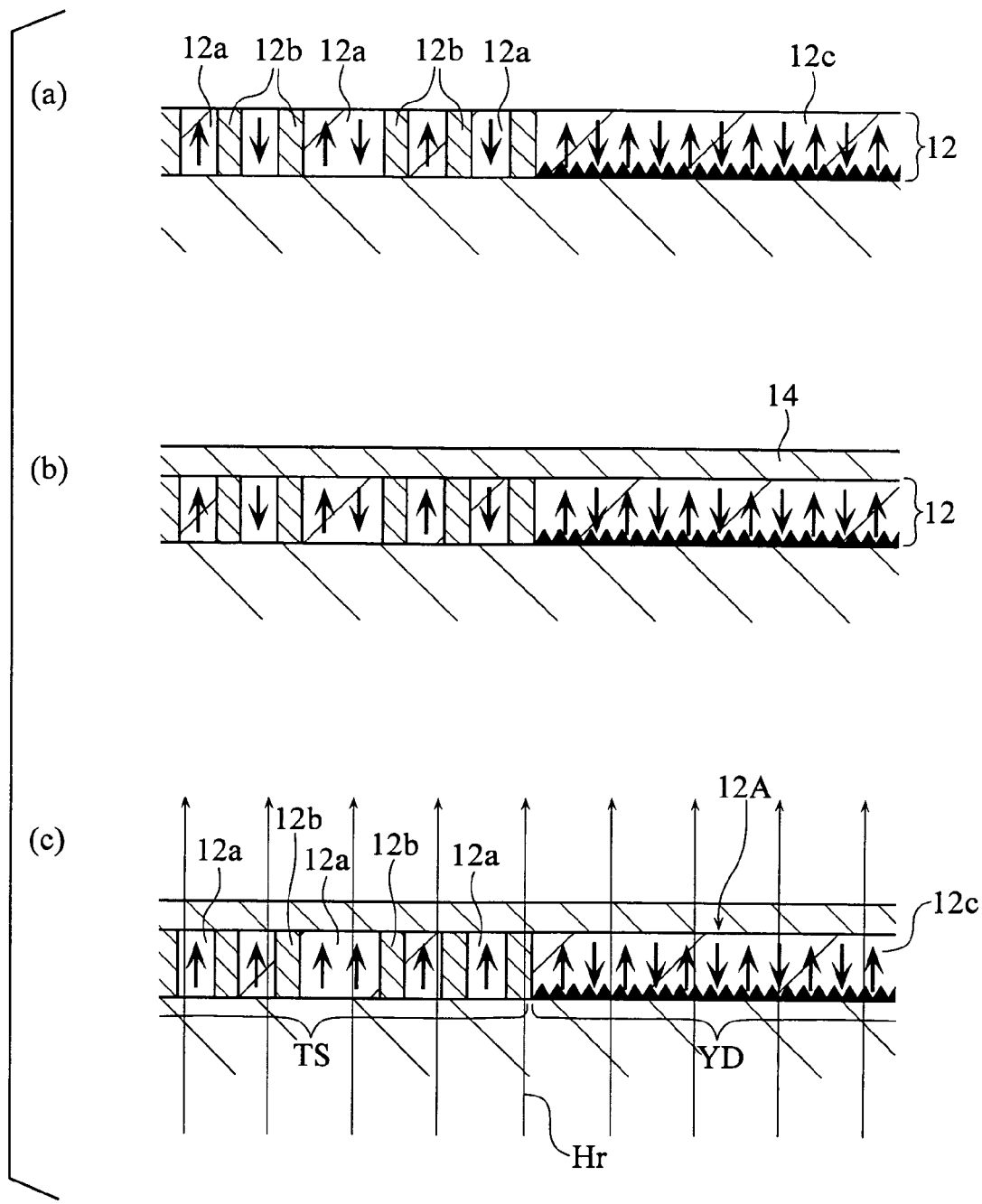
FIGS. 7(a) to 7(c) are cross-sectional views showing the manufacturing process subsequent to FIG. 6(d)

The magnetic region 12a in the track servo signal region TS and the magnetic region 12c in the user data region YD are made of the same magnetic matterial as already stated, however in this embodiment the magnetic region 12c has greater coercive force than the magnetic region 12a, because of the pinni of the minutely rough structure layer 13. FIG. 4 is a graph showing a temperature dependence of the coercive force $Hc_1$ of the magnetic region 12a and the coercive force $Hc_2$ of the magnetic region 12c. In FIG. 4, the horizontal axis represents the temperature, and the vertical axis the coercive force. Although the magnetic regions 12a, 12c are of the same magnetic material, the temperature dependence is different. Specifically, the coercive force $Hc_2$ is greater than the coercive force $Hc_1$, in a temperature range under the Curie temperature Tc.

The cover layer 14 serves to physically and chemically protect the recording layer 12 and the minutely rough structure layer 13 from external objects, and may be made of SiN, $SiO_2$, or diamond-like carbon.

The multilayer structure of the magnetic disk X1, which includes the disk substrate 11, the recording layer 12, the minutely rough structure layer 13 and the cover layer 14, may further include an additional layer if necessary. For example, a so-called soft magnetic material layer may be provided between the disk substrate 11 and the recording layer 12, for converging the recording magnetic field output by a recording magnetic head and thereby reducing the effective recording magnetic field necessary for forming a recording mark.

When recording information on the magnetic disk X1, the magnetic head (not shown) applies the recording magnetic field, thus to create a plurality of recording marks (magnetic domains), alternately magnetized in opposite directions and serially aligned circumferentially of the disk, on the magnetic region 12c in the user data region YD in one of the information tracks 12A. During this process, since the information track 12A to which the magnetic field is sequentially applied for recording information and the adjacent information track 12A are isolated by the non-magnetic region 12B, a cross-write effect, which erases or degrades the recording mark in the adjacent information track 12A, can be prevented. The capability of preventing the cross-write effect is an advantageous feature of the magnetic disk in achieving a finer pitch of the tracks and higher recording density.

FIGS. 5(a) through 7(c) depict a manufacturing method of the magnetic disk X1. These drawings represent the same cross-section as FIG. 3, and show the progress of the manufacturing process of the magnetic disk X1.

To manufacture the magnetic disk X1, firstly a resist pattern 15 is formed on the disk substrate 11 as shown in FIG. 5(a). In this embodiment, the resist pattern 15 has a pattern shape according to the track servo signal region TS of the recording layer 12. To form the resist pattern 15, a liquid photoresist is deposited on the disk substrate 11 by spin coating, and then an exposure and development process is performed so as to shape the photoresist into a predetermined pattern. Resist patterns to be subsequently referred to can also be formed by a similar method.

Proceeding to FIG. 5(b), the minutely rough structure layer 13 is formed on the disk substrate 11. To form the minutely rough structure layer 13, a sputtering process may be employed to grow a material having greater surface tension than the surface of the disk substrate 11 in island configuration. Alternatively, an underlying layer of a material having relatively small surface tension (such as SiN) may be formed on the disk substrate 11 by sputtering, and another material having greater surface tension (such as Pt) may be grown on the underlying layer by sputtering, to thereby form the minutely rough structure layer 13.

Then the resist pattern 15 is removed in FIG. 5(c), after which a magnetic film 16, which is a perpendicular magnetic film, is formed in FIG. 5(d). To form the magnetic film 16, a sputtering process may be employed to deposit one of the materials cited regarding the magnetic region 12a on the disk substrate 11, so as to cover the minutely rough structure layer 13. In this process, the magnetic film 16 is formed in an as-depo state, in which the magnetic film 16 is randomly and generally uniformly magnetized in a vertical direction.

Proceeding to FIG. 6(a), a resist pattern 17 is formed on the magnetic film 16. The resist pattern 17 includes openings 17a located according to the pattern of the non-magnetic region 12b. The resist pattern 17 also includes openings (not shown) located according to the pattern of the non-magnetic region 12B.

An etching process is then performed on the magnetic film 16, utilizing the resist pattern 17 as the mask, as shown in FIG. 6(b). In this process, a dry etching process that employs an Ar gas may be performed. At this stage, the magnetic regions 12a, 12c are formed in the as-depo state.

After removal of the resist pattern 17 as shown in FIG. 6(c), a non-magnetic material 18 is deposited as shown in FIG. 6(d). Specifically, a sputtering process may be employed to deposit one of the non-magnetic materials cited regarding the non-magnetic region 12b, so as to fill at least the grooves among the magnetic regions.

Proceeding to FIG. 7(a), an excessive portion of the non-magnetic material 18 is removed. For the removal, a mechanical polishing process may be employed. At this stage, the non-magnetic region 12b and the non-magnetic region 12B (not shown) are formed, so that the formation of the recording layer 12 is completed.

As shown in FIG. 7(b), the cover layer 14 is then formed on the recording layer 12. A sputtering process may be employed to deposit a predetermined material on the recording layer 12, thus to form the cover layer 14.

Referring now to FIG. 7(c), a predetermined magnetic field Hr, which is stronger than the coercive force $Hc_1$ of the magnetic region 12a but weaker than the coercive force $Hc_2$ of the magnetic region 12c, is collectively applied to the entire recording layer 12, to thereby maintain the as-depo state of the magnetic region 12c in the user data region YD, while magnetizing the magnetic region 12a in the track servo signal region TS in the same direction. The application of such magnetic field results in formation of track servo information, including a plurality of magnetic regions 12a magnetized in the same direction and a plurality of non-magnetic regions 12b, in the track servo signal region TS. Throughout the foregoing process, the magnetic disk X1 including the track servo information in each track servo signal region TS in the respective information tracks 12A of the recording layer 12 can be obtained.

In the magnetic disk X1, as described referring to FIG. 7(c), collectively applying the magnetic field to the entire recording layer 12 enables magnetizing the magnetic region 12a in the same direction in the track servo signal region TS, which facilitates efficiently forming the track servo information. The magnetic disk X1 also eliminates the need to perform the AC erasion process described referring to the conventional magnetic disk 90, for turning the magnetic region 12c in the user data region YD into the as-depo state. This is because the process described referring to FIG. 7(c) enables maintaining the as-depo state of the magnetic region 12c, which is the initial state thereof, based on the difference in coercive force between the magnetic regions 12a and 12c. Thus, the magnetic disk X1 allows efficiently forming the track servo information, and efficiently bringing the magnetic region 12c in the user data region YD into the as-depo state. The magnetic disk X1, consequently, facilitates improving the manufacturing efficiency and reducing the manufacturing cost.

Figure 8:
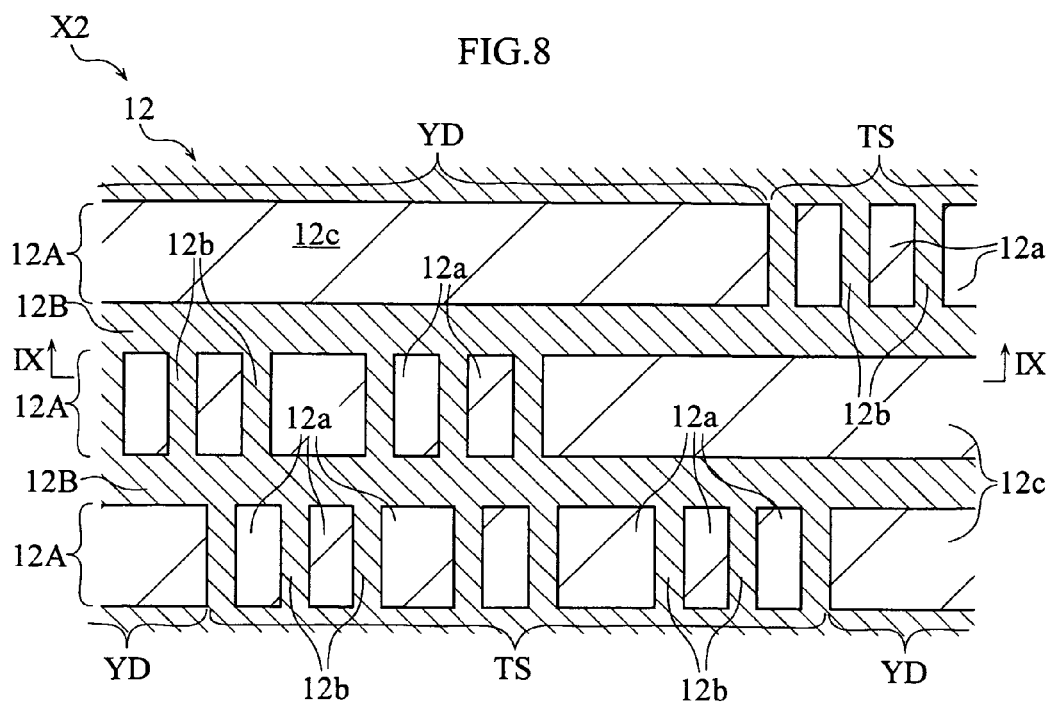
FIG. 8 is a fragmentary plan view showing a magnetic disk according to a second embodiment of the present invention.
Figure 9:
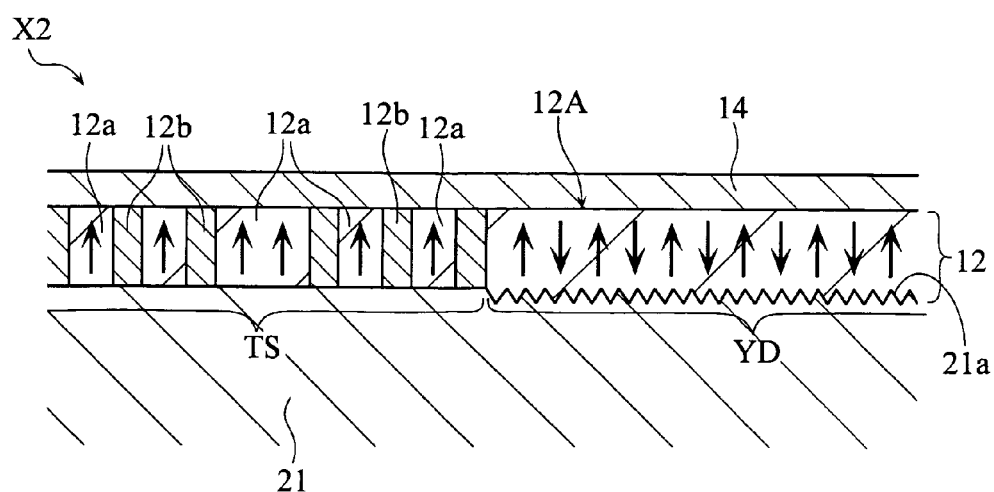
FIG. 9 is a cross-sectional view taken along the line IX-IX in FIG. 8.
Figure 10:
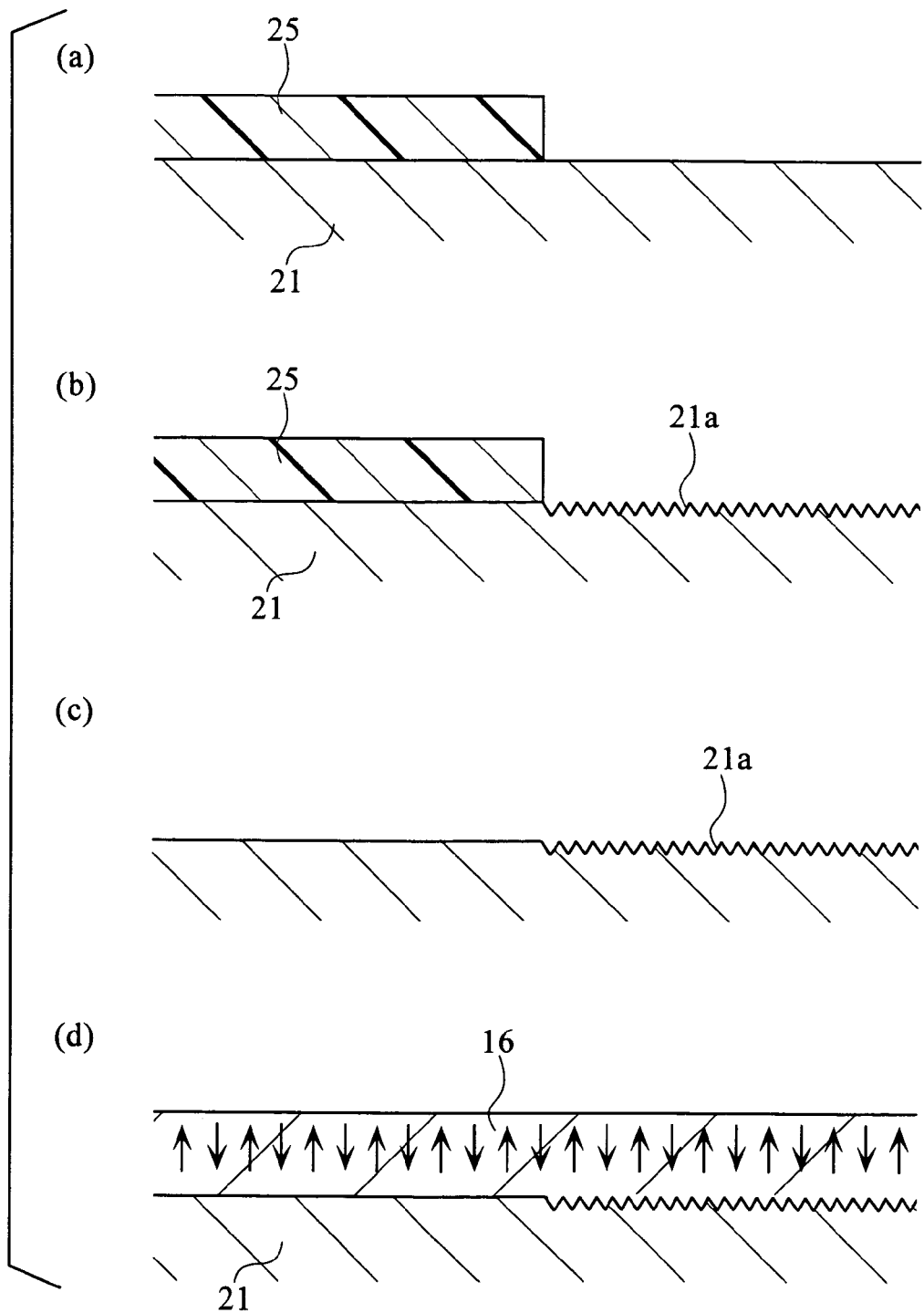
FIGS. 10(a) to 10(d) are cross-sectional views progressively showing a manufacturing process of the magnetic disk according to the second embodiment.
Figure 11:
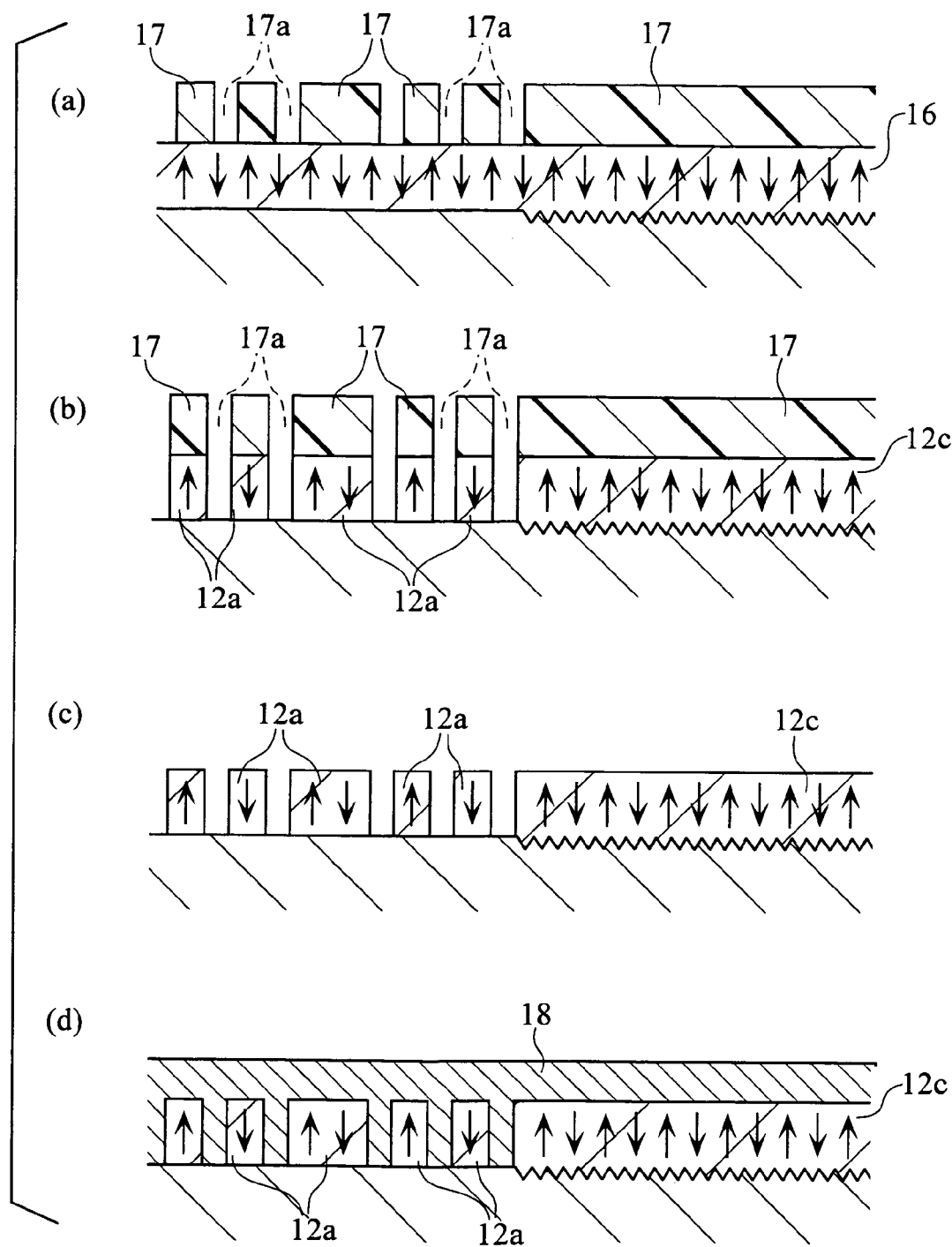
FIGS. 11(a) to 11(d) are cross-sectional views showing the manufacturing process subsequent to FIG. 10(d)
Figure 12:
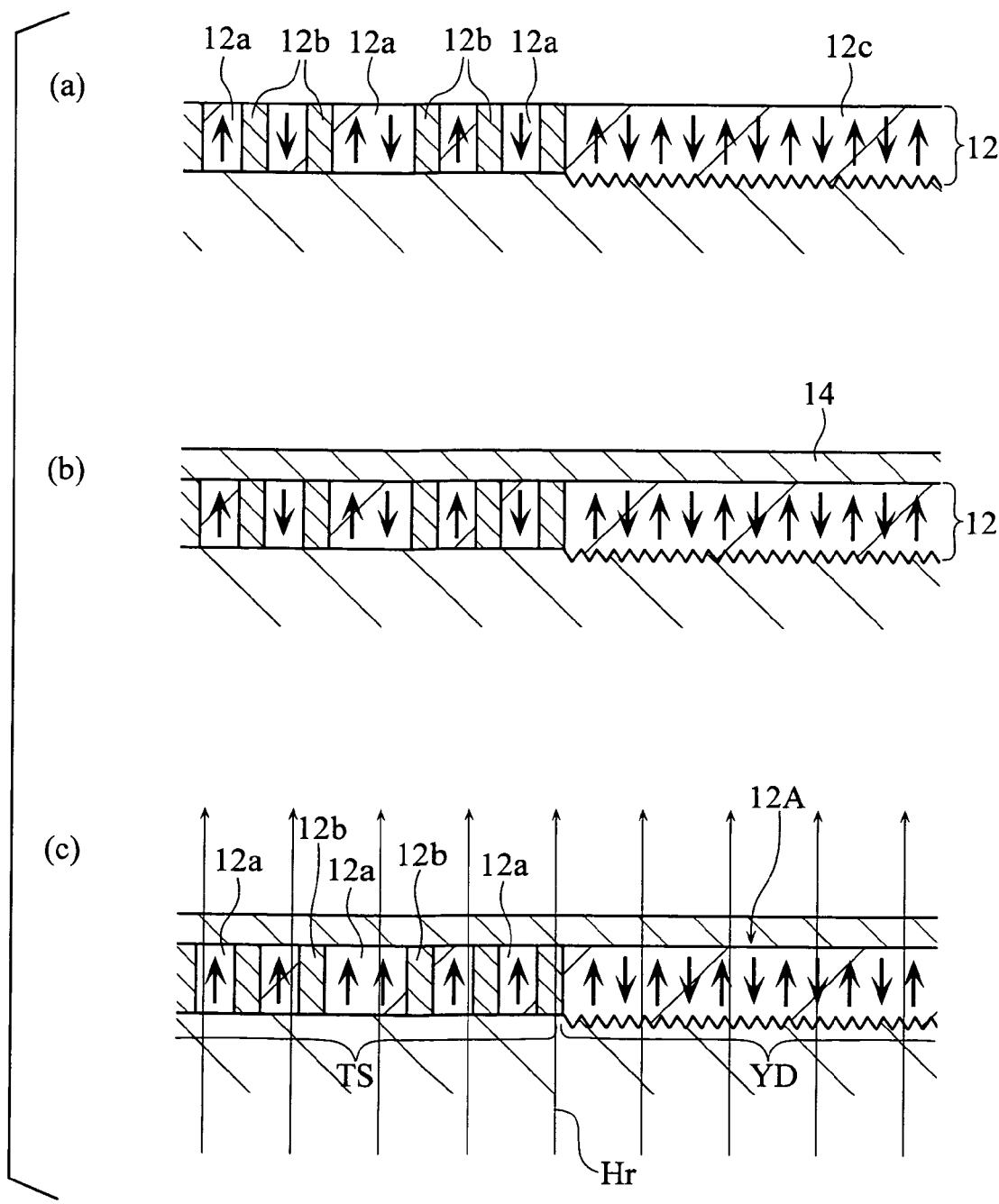
FIGS. 12(a) to 12(c) are cross-sectional views showing the manufacturing process subsequent to FIG. 11(d)

FIGS. 8 and 9 depict a DT type magnetic disk X2, according to a second embodiment of the present invention. FIG. 8 is a fragmentary plan view of the magnetic disk X2, and FIG. 9 is a cross-sectional view taken along the line IX-IX in FIG. 8.

The magnetic disk X2 has a multilayer structure including a disk substrate 21, the recording layer 12, and the cover layer 14 (not shown in FIG. 8), and constitutes a magnetic recording medium capable of recording and reproducing information based on a heat-assisted magnetic recording system. The magnetic disk X2 is different from the magnetic disk X1 in including the disk substrate 21 instead of the disk substrate 11, and not including the minutely rough structure layer 13.

The disk substrate 21 primarily serves to secure sufficient rigidity of the magnetic disk X2, and may be made of an aluminum alloy, glass, silicon, or a polycarbonate resin. The disk substrate 21 includes a rough surface region 21a that serves to increase the coercive force of the magnetic region 12c in the user data region YD of the information track 12A. The rough surface region 21a is located in a region on the disk substrate 21 at least corresponding to the user data region YD, except a region corresponding to the track servo signal region TS of the recording layer 12 (for example, all over the disk substrate 21 except the region corresponding to the track servo signal region TS of the recording layer 12). The rough surface region 21a has a minutely rough structure that applies a pinning effect to the magnetic region 12c in the user data region YD, thus to increase the effective coercive force of the magnetic region 12c. The rough surface region 21a has a surface roughness Ra of for instance 0.5 to 2 nm, and an average diameter (average particle size) of a protruding portion (grown particle) of the rough structure is 5 to 10 nm, for instance.

Although the magnetic region 12a in the track servo signal region TS and the magnetic region 12c in the user data region YD are made of the same magnetic material, in this embodiment the magnetic region 12c has greater coercive force than the magnetic region 12a, because of the pinning effect of the rough surface region 21a. As shown in FIG. 4 for example, the coercive force $Hc_2$ of the magnetic region 12c can be made greater than the coercive force $Hc_1$ of the magnetic region 12a.

FIGS. 10(a) through 12(c) depict a manufacturing method of the magnetic disk X2. These drawings represent the same cross-section as FIG. 9, and show the progress of the manufacturing process of the magnetic disk X2.

To manufacture the magnetic disk X2, firstly a resist pattern 25 is formed on the disk substrate 21 as shown in FIG. 10(a). In this embodiment, the resist pattern 25 has a pattern shape according to the track servo signal region TS of the recording layer 12.

Proceeding to FIG. 10(b), the rough surface region 21a is formed on the disk substrate 21. To form the rough surface region 21a, a dry etching process may be performed on the disk substrate 21 utilizing the resist pattern 25 as the mask. An Ar gas may be employed as the etching gas.

Then the resist pattern 25 is removed in FIG. 10(c), after which a magnetic film 16, which is a perpendicular magnetic film, is formed in FIG. 10(d). The magnetic film 16 may be formed by a similar method to the first embodiment. In this process, the magnetic film 16 is formed in an as-depo state, in which the magnetic film 16 is randomly and generally uniformly magnetized in a vertical direction.

Proceeding to FIG. 11(a), a resist pattern 17 is formed on the magnetic film 16. An etching process is then performed on the magnetic film 16, utilizing the resist pattern 17 as the mask, as shown in FIG. 11(b). At this stage, the magnetic regions 12a, 12c are formed in the as-depo state. After removal of the resist pattern 17 as shown in FIG. 11(c), a non-magnetic material 18 is deposited as shown in FIG. 11(d). Proceeding to FIG. 12(a), an excessive portion of the non-magnetic material 18 is removed. At this stage, the non-magnetic region 12b and the non-magnetic region 12B (not shown) are formed. Then as shown in FIG. 12(b), the cover layer 14 is formed on the recording layer 12. Specific methods of such process are similar to those described referring to the first embodiment, from the formation of the resist pattern 17 to the formation of the cover layer 14.

Referring now to FIG. 12(c), a predetermined magnetic field Hr, which is stronger than the coercive force $Hc_1$ of the magnetic region 12a but weaker than the coercive force $Hc_2$ of the magnetic region 12c, is collectively applied to the entire recording layer 12, to thereby maintain the as-depo state of the magnetic region 12c in the user data region YD, while magnetizing the magnetic region 12a in the track servo signal region TS in the same direction. The application of the magnetic field results in formation of the track servo information, including a plurality of magnetic regions 12a magnetized in the same direction and a plurality of non-magnetic regions 12b, in the track servo signal region TS. Throughout the foregoing process, the magnetic disk X2 including the track servo information in each track servo signal region TS in the respective information tracks 12A of the recording layer 12 can be obtained.

In the magnetic disk X2, as described referring to FIG. 12(c), collectively applying the magnetic field to the entire recording layer 12 enables magnetizing the magnetic region 12a in the same direction in the track servo signal region TS, which facilitates efficiently forming the track servo information. The magnetic disk X2 also eliminates the need to perform the AC erasion process described referring to the conventional magnetic disk 90, for turning the magnetic region 12c in the user data region YD into the as-depo state. This is because the process described referring to FIG. 12(c) enables maintaining the as-depo state of the magnetic region 12c, which is the initial state thereof, based on the difference in coercive force between the magnetic regions 12a and 12c. Thus, the magnetic disk X2 allows, like the magnetic disk X1, efficiently forming the track servo information, and efficiently bringing the magnetic region 12c in the user data region YD into the as-depo state. The magnetic disk X2, consequently, facilitates improving the manufacturing efficiency and reducing the manufacturing cost.

Figure 13:
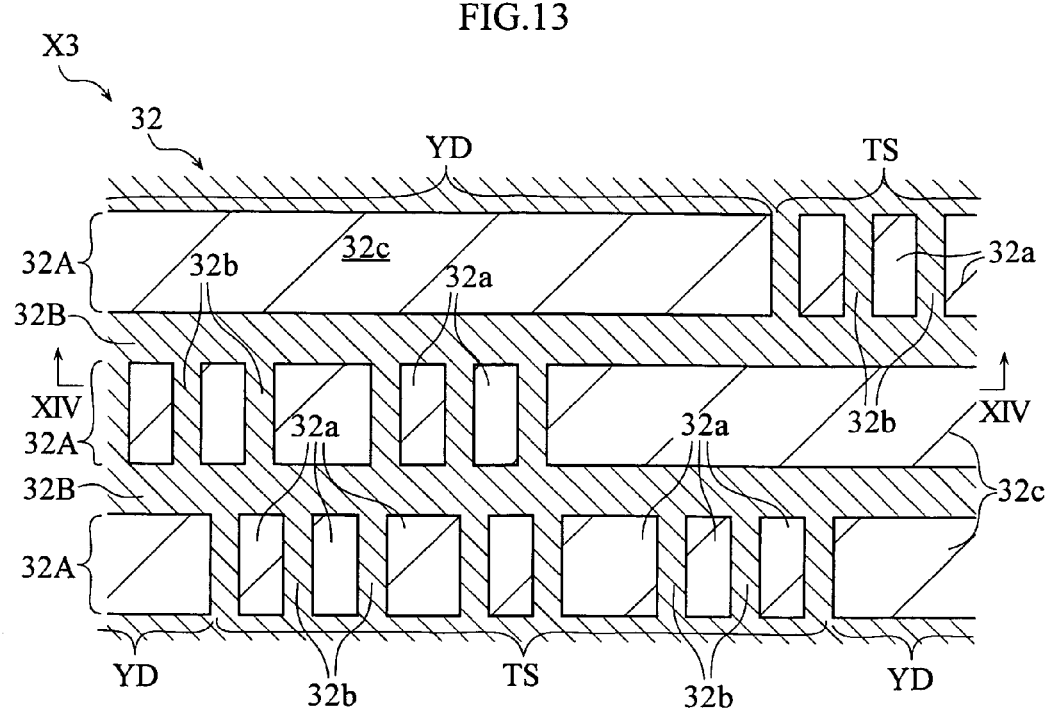
FIG. 13 is a fragmentary plan view showing a magnetic disk according to a third embodiment of the present invention.
Figure 14:
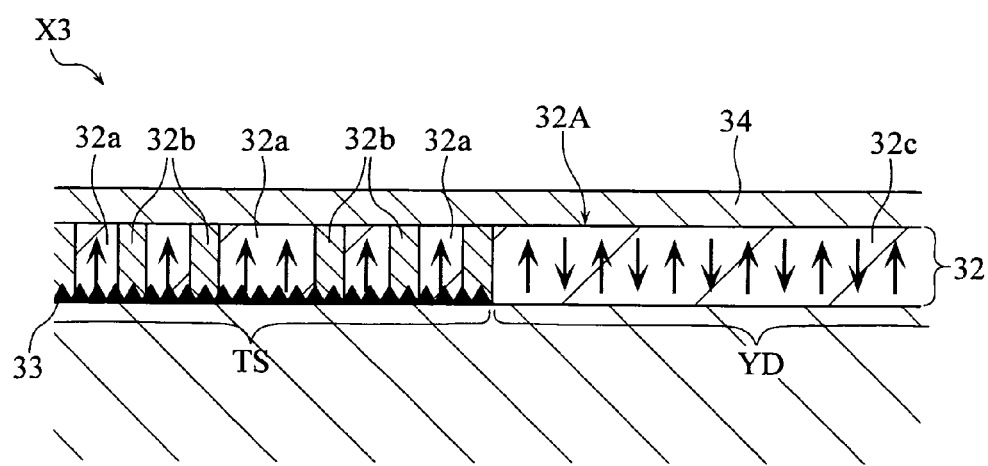
FIG. 14 is a cross-sectional view taken along the line XIV-XIV in FIG. 13.

FIGS. 13 and 14 depict a DT type magnetic disk X3, according to a third embodiment of the present invention. FIG. 13 is a fragmentary plan view of the magnetic disk X3, and FIG. 14 is a cross-sectional view taken along the line XIV-XIV in FIG. 13.

The magnetic disk X3 has a multilayer structure including a disk substrate 31, a recording layer 32, a minutely rough structure layer 33 (not shown in FIG. 13), and a cover layer 34 (not shown in FIG. 13), and constitutes a magnetic recording medium capable of recording and reproducing information based on a heat-assisted magnetic recording system.

The disk substrate 31 primarily serves to secure sufficient rigidity of the magnetic disk X3, and may be made of an aluminum alloy, glass, or a polycarbonate resin.

The recording layer 32 includes, as shown in FIG. 13, a plurality of information tracks 32A and a plurality of non-magnetic regions 32B. The information tracks 32A are concentrically disposed on the disk substrate 31 around the rotation center of the magnetic disk X3. The information tracks 32A, a part of which is shown in FIG. 13, are respectively divided into a plurality of track servo signal regions Ts and a plurality of user data regions YD. The track servo signal regions TS respectively include a plurality of magnetic regions 32a and a plurality of non-magnetic regions 32b, such that the adjacent magnetic regions 32a are isolated from each other by the non-magnetic region 32b. The magnetic regions 32a respectively have what is known as perpendicular magnetic anisotropy, and are magnetized in the same direction. The coercive force $Hc_1$ of the magnetic region 32a is, for instance, 3 to 5 kOe in room temperature. The magnetic region 32a and the non-magnetic region 12b may be made of the materials cited referring to the magnetic region 12a and the non-magnetic region 12b of the first embodiment. The magnetic regions 32a and the non-magnetic regions 32b constitute track servo information. The user data region YD includes a magnetic region 32c, where user data is to be written, extending along the extending direction of the information track 32A. The magnetic region 32c is made of the same material as the magnetic region 32a having the perpendicular magnetic anisotropy, and is in so-called an "as-depo" state in which the region is randomly and generally uniformly magnetized in a vertical direction, before the user data is first written thereon. The coercive force $Hc_2$ of the magnetic region 32c is for instance 2 to 4 kOe in room temperature, but smaller than the coercive force $Hc_1$ of the magnetic region 32a. The non-magnetic regions 32B are interposed among the information tracks 32A, and made of the same non-magnetic material of the non-magnetic region 32b. The recording layer 32 thus configured has a thickness of 15 nm, for instance.

The minutely rough structure layer 33 serves to increase the coercive force of the magnetic region 32a in the track servo signal region TS of the information track 32A, and is located in a region on the disk substrate 31 at least corresponding to the track servo signal region TS, except a region corresponding to the user data region YD of the recording layer 32 (for example, all over the disk substrate 31 except the region corresponding to the user data region YD of the recording layer 32). The minutely rough structure layer 33 has, on the surface opposing the recording layer 32, a minutely rough structure that applies a pinning effect to the magnetic region 32a in the track servo signal region TS. Except for the foregoing, the minutely rough structure layer 33 is similarly configured to the minutely rough structure layer 13 of the first embodiment.

Figure 15:
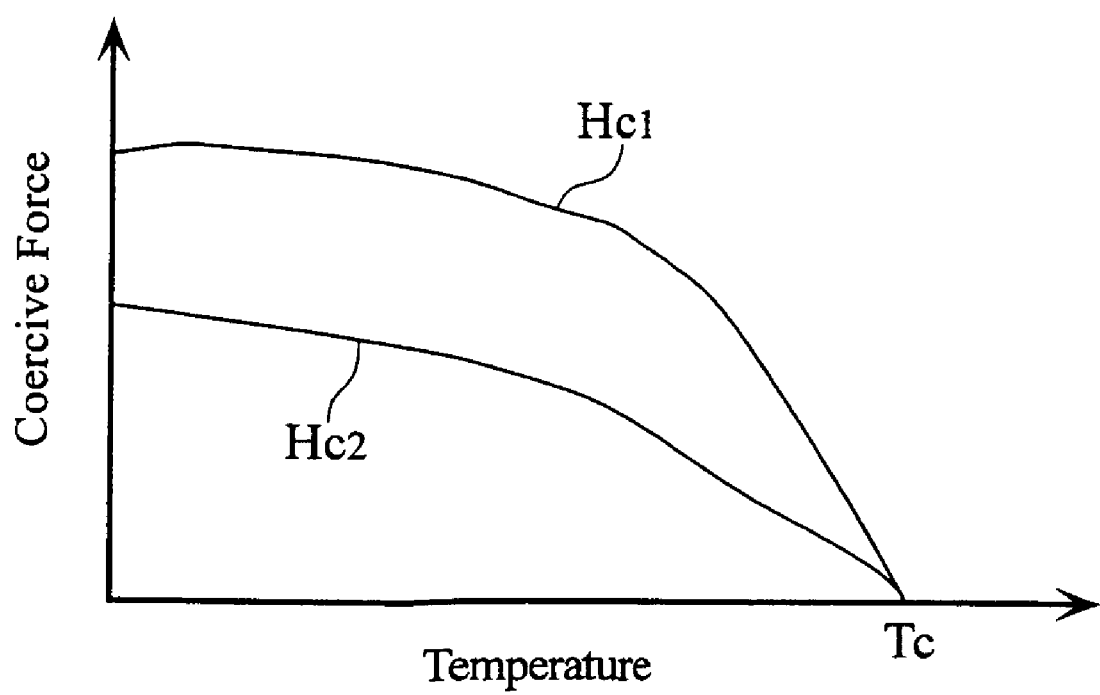
FIG. 15 is a graph showing a temperature dependence of coercive force of a first magnetic region and that of a second magnetic region of the magnetic disk according to the third embodiment.
Figure 16:
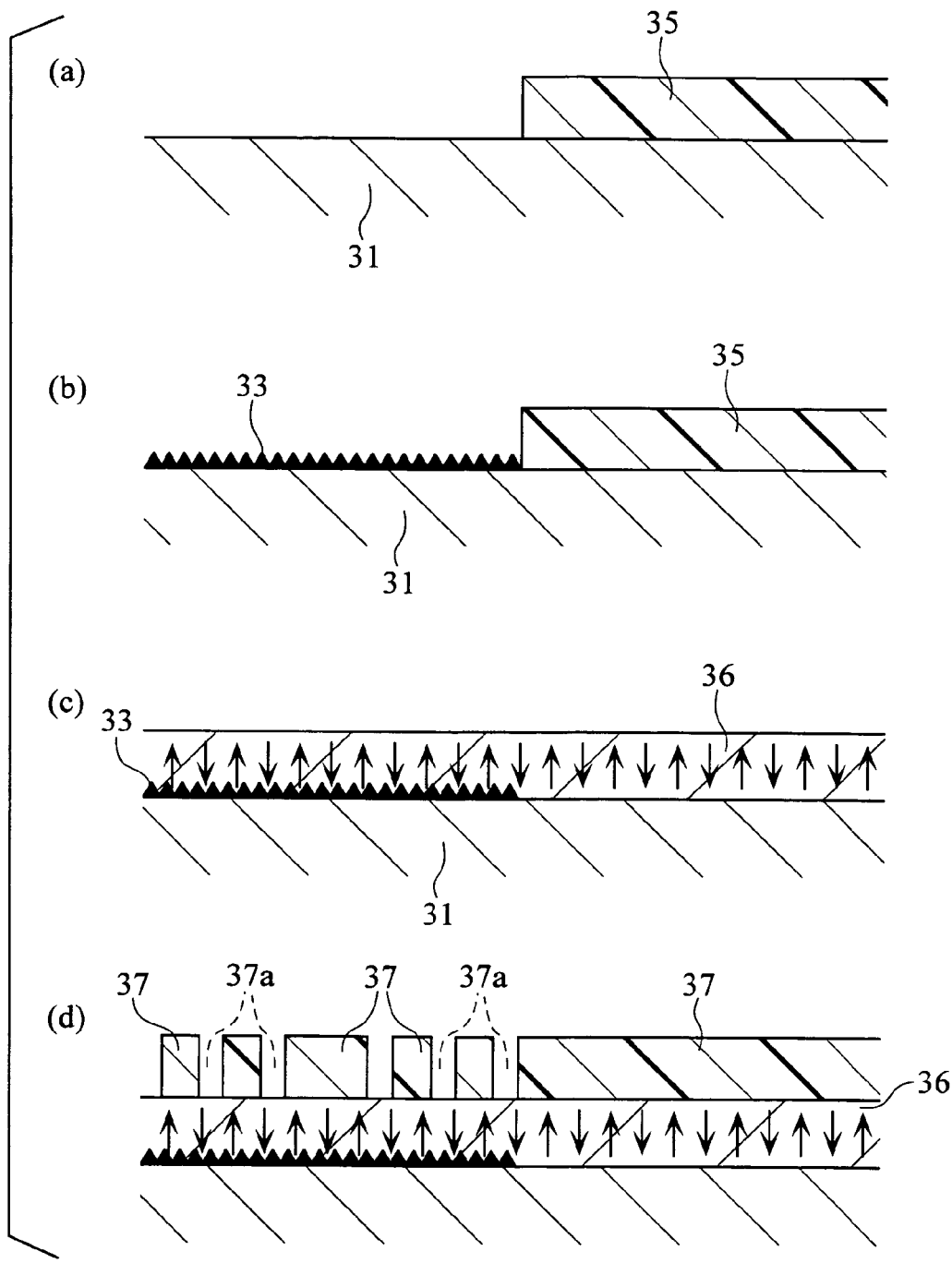
FIGS. 16(a) to 16(d) are cross-sectional views progressively showing a manufacturing process of the magnetic disk according to the third embodiment.
Figure 17:
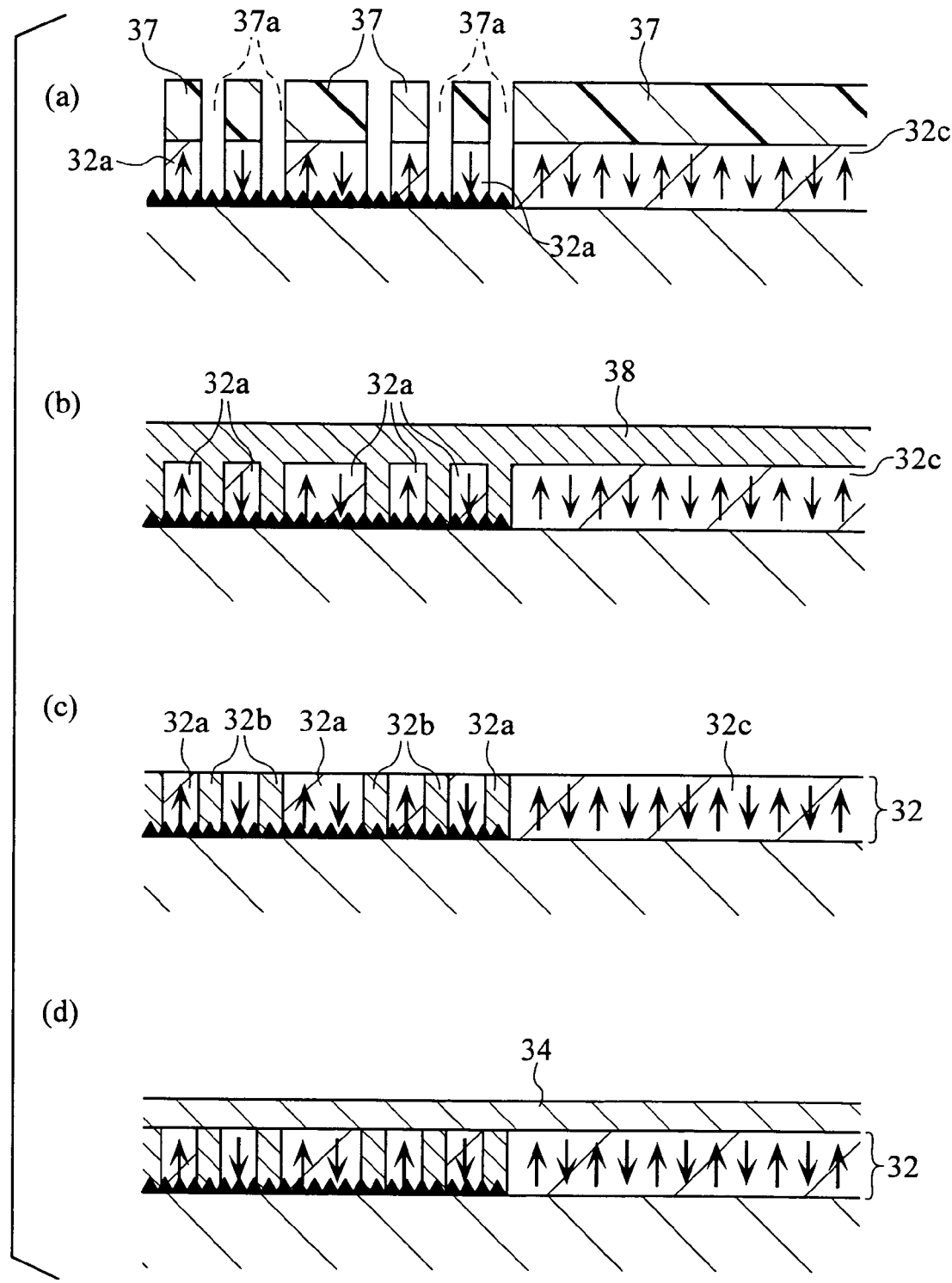
FIGS. 17(a) to 17(d) are cross-sectional views showing the manufacturing process subsequent to FIG. 16(d)
Figure 18:
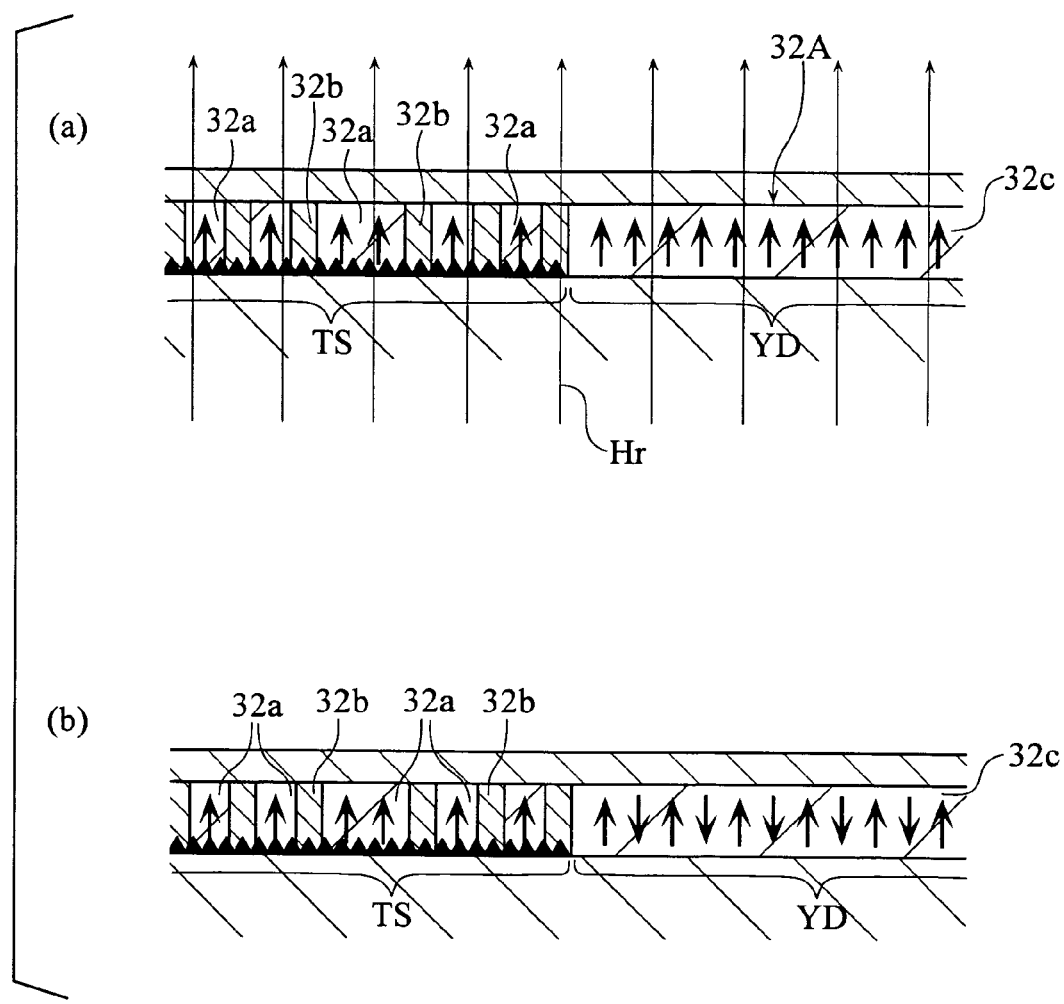
FIGS. 18(a) and 18(b) are cross-sectional views showing the manufacturing process subsequent to FIG. 17(d)

Although the magnetic region 32a in the track servo signal region TS and the magnetic region 32c in the user data region YD are made of the same magnetic material as already stated, in this embodiment the magnetic region 32a has greater coercive force than the magnetic region 32c, because of the pinning effect of the minutely rough structure layer 33. FIG. 15 is a graph showing a temperature dependence of the coercive force $Hc_1$ of the magnetic region 32a and the coercive force $Hc_2$ of the magnetic region 32c. In FIG. 15, the horizontal axis represents the temperature, and the vertical axis the coercive force. Although the magnetic regions 32a, 32c are of the same magnetic material, the temperature dependence is different. Specifically, the coercive force $Hc_1$ is greater than the coercive force $Hc_2$, in a temperature range under the Curie temperature Tc.

The cover layer 34 serves to physically and chemically protect the recording layer 32 and the minutely rough structure layer 33 from external objects, and may be made of SiN, $SiO_2$, or diamond-like carbon.

The multilayer structure of the magnetic disk X3, which includes the disk substrate 31, the recording layer 32, the minutely rough structure layer 33 and the cover layer 34, may further include an additional layer if necessary.

When recording information on the magnetic disk X3, the magnetic head (not shown) applies the recording magnetic field, thus to create a plurality of recording marks (magnetic domains), alternately magnetized in opposite directions and serially aligned circumferentially of the disk, on the magnetic region 32c in the user data region YD in one of the information tracks 32A. During this process, since the information track 32A to which the magnetic field is sequentially applied for recording information and the adjacent information track 32A are isolated by the non-magnetic region 32B, a cross-write effect, which erases or degrades the recording mark in the adjacent information track 32A, can be prevented. The capability of preventing the cross-write effect is an advantageous feature of the magnetic disk in achieving a finer pitch of the tracks and higher recording density.

FIGS. 16(a) through 18(b) depict a manufacturing method of the magnetic disk X3. These drawings represent the same cross-section as FIG. 14, and show the progress of the manufacturing process of the magnetic disk X3.

To manufacture the magnetic disk X3, firstly a resist pattern 35 is formed on the disk substrate 31 as shown in FIG. 16(a). In this embodiment, the resist pattern 35 has a pattern shape according to the user data region YD of the recording layer 32.

Proceeding to FIG. 16(b), the minutely rough structure layer 33 is formed on the disk substrate 31. The minutely rough structure layer 33 may be formed by a similar method to the formation of the minutely rough structure layer 13 of the first embodiment.

Then the resist pattern 35 is removed, after which a magnetic film 36, which is a perpendicular magnetic film, is formed as shown in FIG. 16(c). To form the magnetic film 16, a sputtering process may be performed to deposit a predetermined magnetic material on the disk substrate 31, so as to cover the minutely rough structure layer 33. In this process, the magnetic film 16 is formed in an as-depo state, in which the magnetic film 16 is randomly and generally uniformly magnetized in a vertical direction.

Proceeding to FIG. 16(d), a resist pattern 37 is formed on the magnetic film 36. The resist pattern 37 includes openings 37a located according to the pattern of the non-magnetic region 32b. The resist pattern 37 also includes openings (not shown) located according to the pattern of the non-magnetic region 32B.

An etching process is then performed on the magnetic film 36, utilizing the resist pattern 37 as the mask, as shown in FIG. 17(a). In this process, a dry etching process that employs an Ar gas may be performed. At this stage, the magnetic regions 32a, 32c are formed in the as-depo state.

After removal of the resist pattern 37, a predetermined non-magnetic material 38 is deposited as shown in FIG. 17(b). Specifically, a sputtering process may be employed to deposit the non-magnetic material so as to fill at least the grooves among the magnetic regions.

Proceeding to FIG. 17(c), an excessive portion of the non-magnetic material 18 is removed, for example by mechanical polishing. At this stage, the non-magnetic region 32b and the non-magnetic region 32B (not shown) are formed.

As shown in FIG. 17(d), the cover layer 34 is then formed on the recording layer 32, for example by sputtering to deposit a predetermined material on the recording layer 32.

Referring now to FIG. 18(a), a predetermined magnetic field Hr, which is stronger than the coercive force $Hc_1$ of the magnetic region 32a (hence also stronger than the coercive force $Hc_2$ of the magnetic region 32c) is collectively applied to the entire recording layer 32, to thereby magnetize the magnetic regions 32a and 32c in the same direction. The application of the magnetic field results in formation of the track servo information, including a plurality of magnetic regions 32a and a plurality of non-magnetic regions 32b magnetized in the same direction, in the track servo signal region TS.

The entire disk is then heated at a predetermined temperature, to thereby maintain the magnetizing direction of the magnetic region 32a, which has the greater coercive force $Hc_1$, while thermally relaxing the magnetic region 32c having the smaller coercive force $Hc_2$ thus turning the magnetic region 32c into the as-depo state. Throughout the foregoing process, the magnetic disk X3 including the track servo information in each track servo signal region TS in the respective information tracks 32A of the recording layer 32 can be obtained.

In the magnetic disk X3, as described referring to FIG. 18(a), collectively applying the magnetic field to the entire recording layer 32 enables magnetizing the magnetic region 32a in the same direction in the track servo signal region TS, which facilitates efficiently forming the track servo information. The magnetic disk X3 also eliminates the need to perform the AC erasion process described referring to the conventional magnetic disk 90, for turning the magnetic region 32c in the user data region YD into the as-depo state. This is because the process described referring to FIG. 18(b) enables turning the magnetic region 32c into the as-depo state by thermal relaxation, while maintaining the magnetizing direction of the magnetic region 32a, based on the difference in coercive force between the magnetic regions 32a and 32c. Thus, the magnetic disk X3 allows, like the magnetic disk X1, efficiently forming the track servo information, and efficiently bringing the magnetic region 12c in the user data region YD into the as-depo state. The magnetic disk X3, consequently, facilitates improving the manufacturing efficiency and reducing the manufacturing cost.

In the manufacturing method according to this embodiment, the non-magnetic material 38 that applies a predetermined amount of stress to the magnetic regions 32a, 32c may be deposited, in the process described referring to FIG. 17(b). The magnitude of the stress can be adjusted by controlling the gas pressure and power to be supplied by the sputtering apparatus employed for depositing the non-magnetic material 38. The stress imposed by the deposited non-magnetic material 38 affects more prominently on each of the magnetic regions 32a than on the magnetic region 32c, because the former is actually split into smaller sections than the latter, and hence the stress generated in each magnetic region 32a by the stress applied by the non-magnetic material 38 is greater than the net stress generated in the magnetic region 32c. An increase in internal stress in a portion made of a magnetic material may incur an increase in coercive force of the portion. Accordingly, a significant stress effect of a predetermined magnitude imposed by the non-magnetic material 38 (or the non-magnetic regions 32B, 32b made of the non-magnetic material 38) may contribute to making the coercive force $Hc_1$ of the magnetic region 32a greater than the coercive force $Hc_2$ of the magnetic region 32c. Alternatively, according to the present invention, the internal stress in the magnetic region 32a may be made greater than the net internal stress in the magnetic region 32c by the above method, instead of providing the minutely rough structure layer 33, so as to make the coercive force $Hc_1$ of the magnetic region 32a greater than the coercive force $Hc_2$ of the magnetic region 32c.

In the manufacturing method according to this embodiment, a dry etching process may be performed with an Ar gas after the removal of the resist pattern 37 and before the deposition of the non-magnetic material 38 as shown in FIG. 17(b), so as to roughen the sidewall of the magnetic regions 32a, 32c. Filling the grooves among the magnetic regions with the non-magnetic material 38 as described referring to FIG. 17(b), after roughening the sidewall of the magnetic regions 32a, 32c, facilitates generation of or an increase in internal stress in the magnetic regions 32a, 32c. The effect of the sidewall roughening works more prominently on each of the magnetic regions 32a than on the magnetic region 32c, because the former is actually split into smaller sections than the latter, and hence the stress generated in each magnetic region 32a by the effect of the sidewall roughening is greater than the net stress generated in the magnetic region 32c. An increase in internal stress in a portion made of a magnetic material may incur an increase in coercive force of the portion. Accordingly, roughening the sidewall of the magnetic regions may contribute to making the coercive force $Hc_1$ of the magnetic region 32a greater than the coercive force $Hc_2$ of the magnetic region 32c. Alternatively, according to the present invention, the internal stress in the magnetic region 32a may be made greater than the net internal stress in the magnetic region 32c by roughening the sidewall of the magnetic regions, instead of providing the minutely rough structure layer 33, so as to make the coercive force $Hc_1$ of the magnetic region 32a greater than the coercive force $Hc_2$ of the magnetic region 32c.

Figure 19:
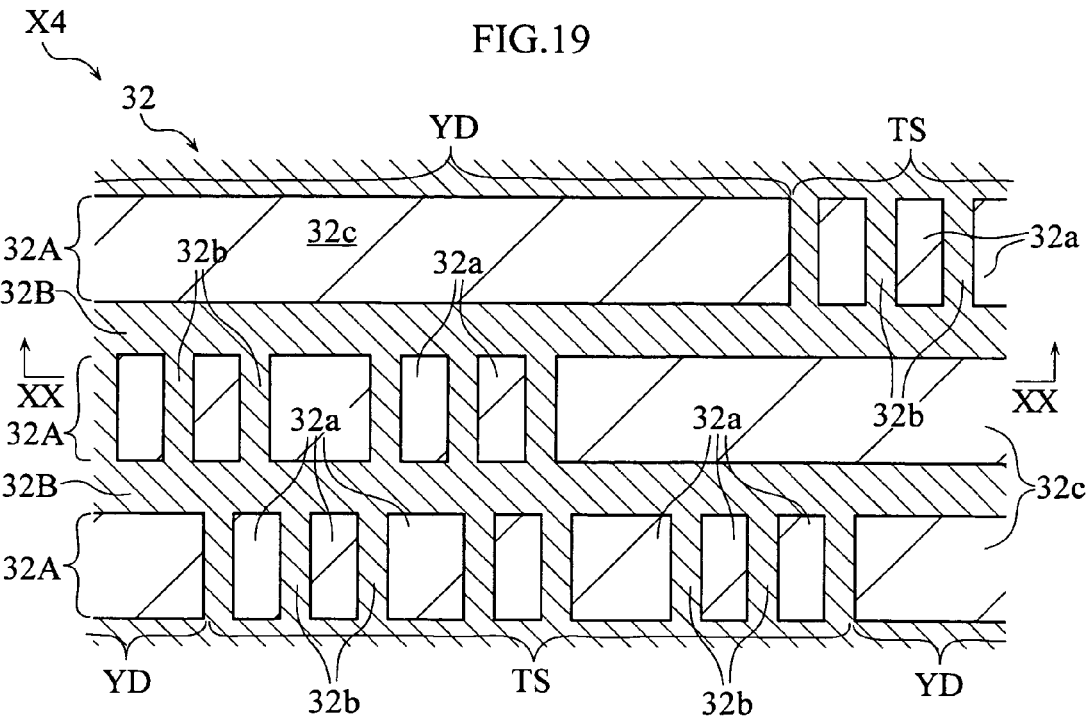
FIG. 19 is a fragmentary plan view showing a magnetic disk according to a fourth embodiment of the present invention.
Figure 20:
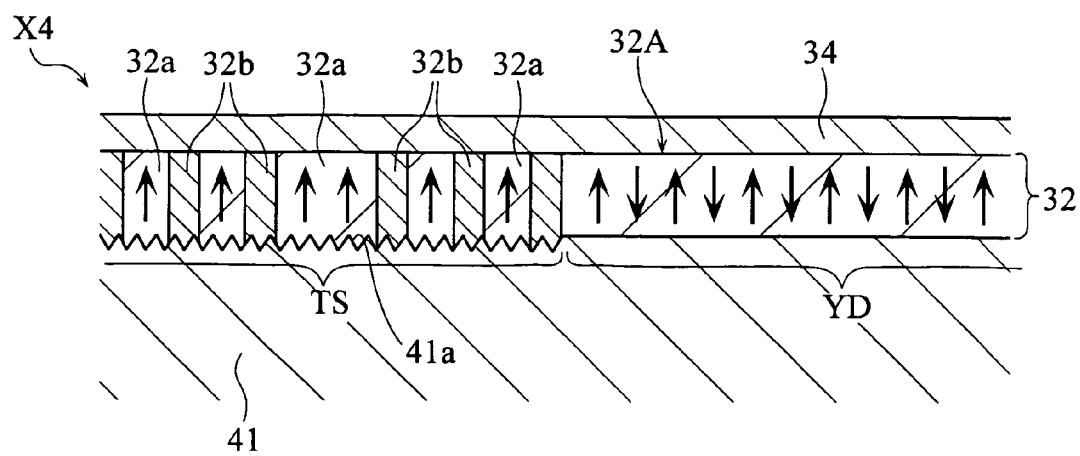
FIG. 20 is a cross-sectional view taken along the line XX-XX in FIG. 19.
Figure 21:
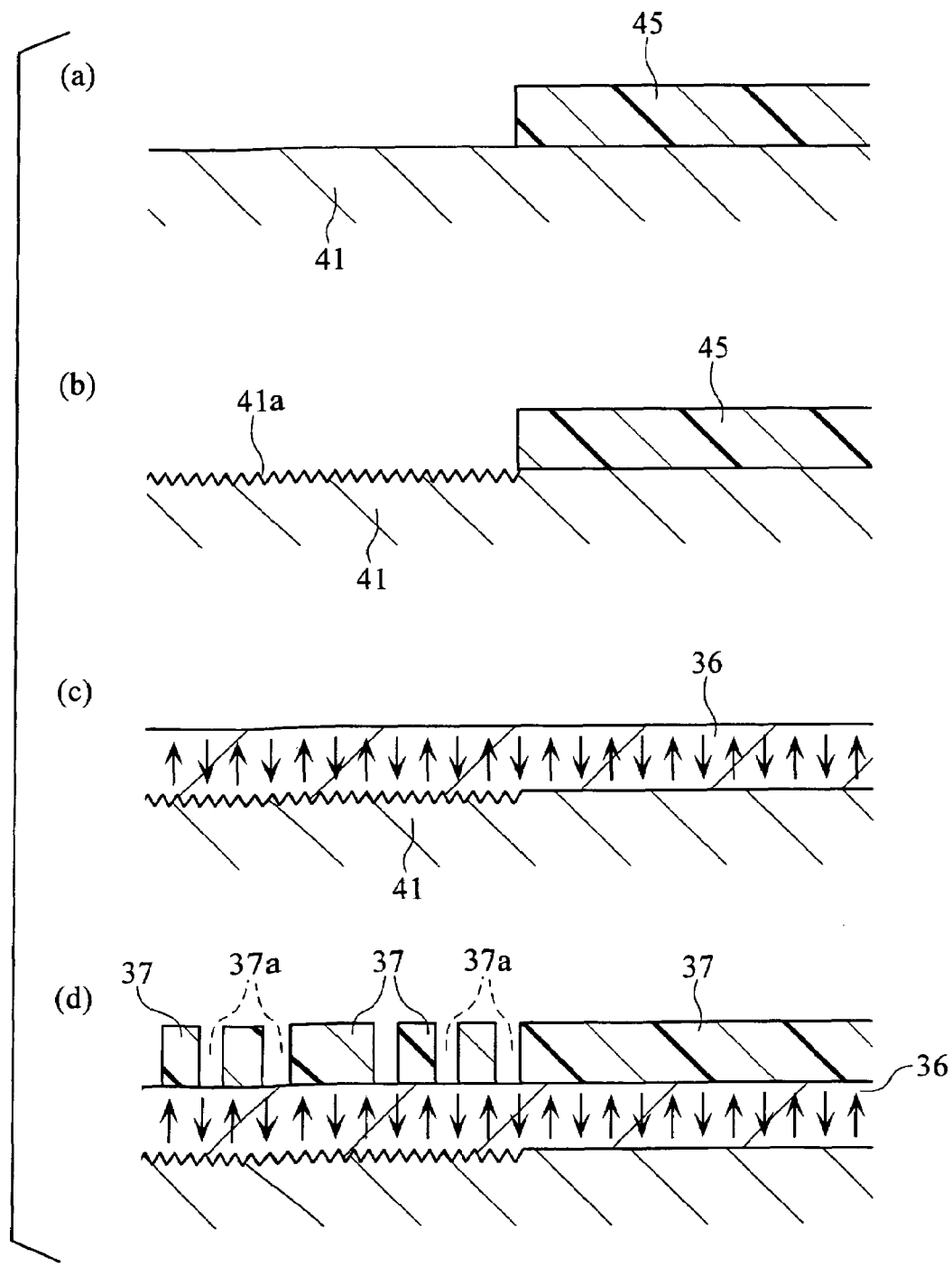
FIGS. 21(a) to 21(d) are cross-sectional views progressively showing a manufacturing process of the magnetic disk according to the fourth embodiment.
Figure 22:
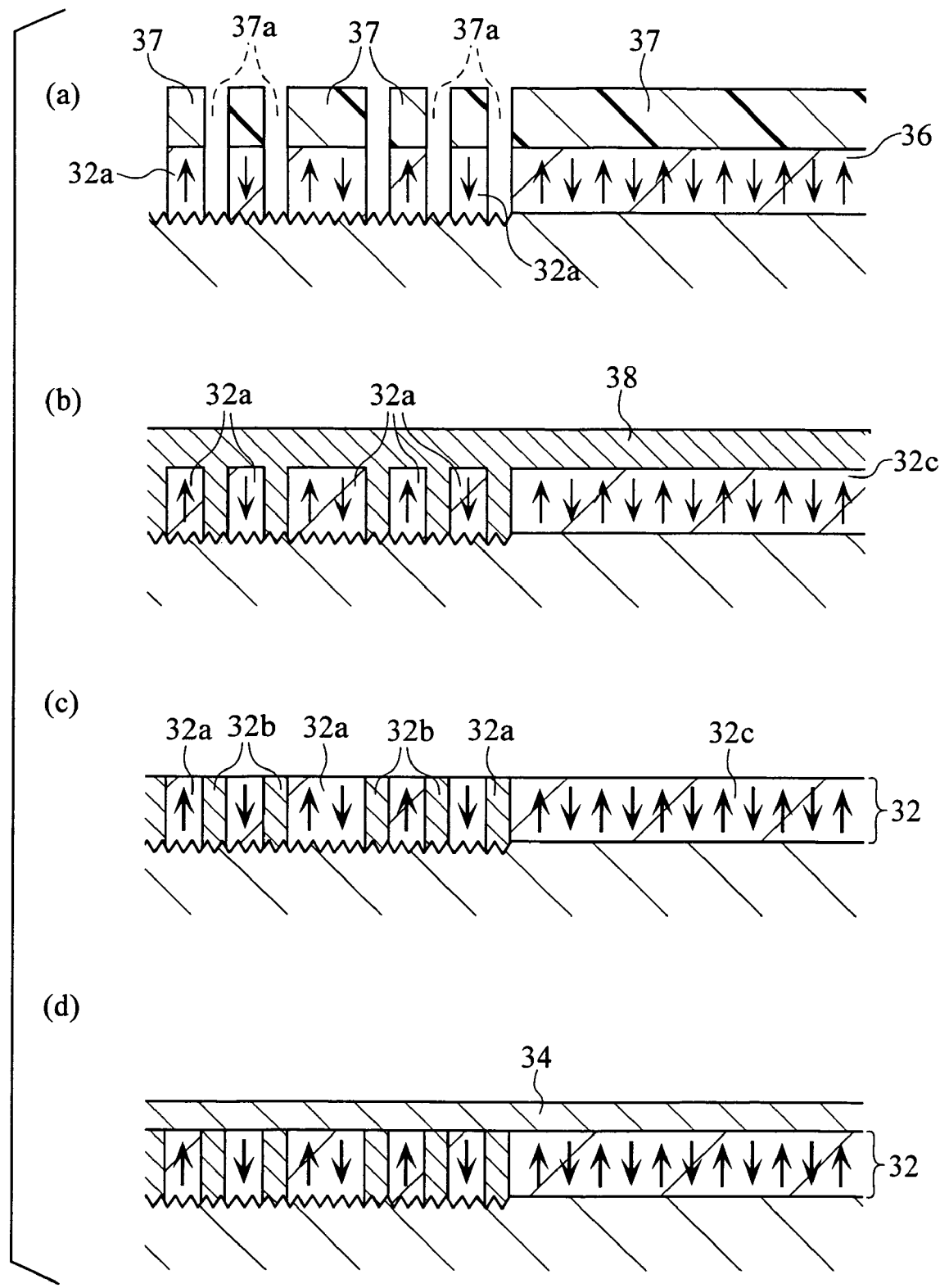
FIGS. 22(a) to 22(d) are cross-sectional views showing the manufacturing process subsequent to FIG. 21(d)
Figure 23:
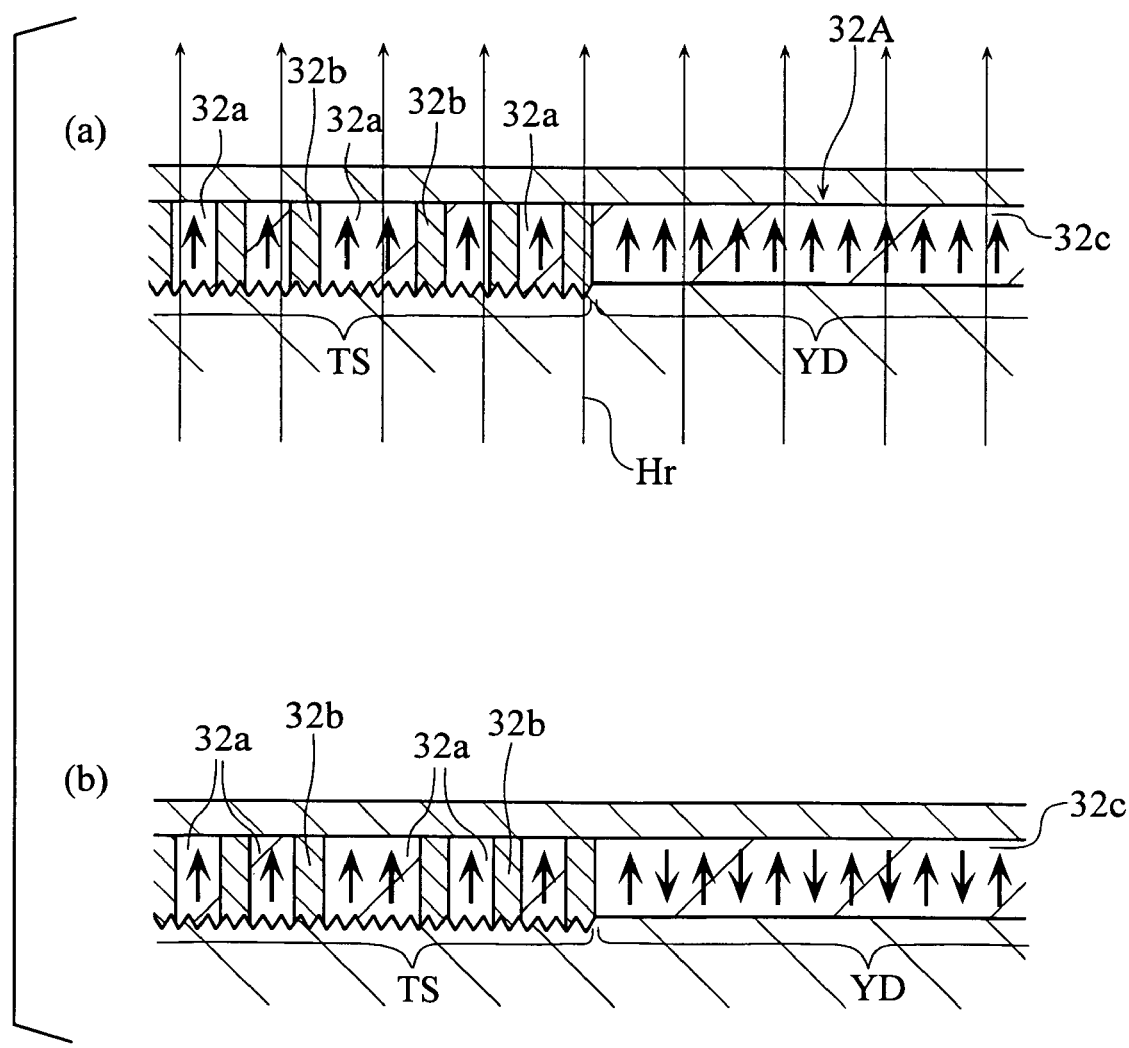
FIGS. 23(a) and 23(b) are cross-sectional views showing the manufacturing process subsequent to FIG. 22(d)

FIGS. 19 and 20 depict a DT type magnetic disk X4, according to a fourth embodiment of the present invention. FIG. 19 is a fragmentary plan view of the magnetic disk X4, and FIG. 20 is a cross-sectional view taken along the line XX-XX in FIG. 19.

The magnetic disk X4 has a multilayer structure including a disk substrate 41, the recording layer 32, and the cover layer 34 (not shown in FIG. 19), and constitutes a magnetic recording medium capable of recording and reproducing information based on a heat-assisted magnetic recording system. The magnetic disk X4 is different from the magnetic disk X3 in including the disk substrate 41 instead of the disk substrate 31, and not including the minutely rough structure layer 33.

The disk substrate 41, which primarily serves to secure sufficient rigidity of the magnetic disk X4, may be made of an aluminum alloy, glass, silicon, or a polycarbonate resin, and includes a rough surface region 41a that serves to increase the coercive force of the magnetic region 32a in the track servo signal region TS of the information track 12A. The rough surface region 41a is located in a region on the disk substrate 41 at least corresponding to the track servo signal region TS, except a region corresponding to the user data region YD of the recording layer 32 (for example, all over the disk substrate 41 except the region corresponding to the user data region YD of the recording layer 32). The rough surface region 41a has a minutely rough structure that applies a pinning effect to the magnetic region 32a in the track servo signal region TS, thus to increase the coercive force thereof. The rough surface region 41a has a surface roughness Ra of for instance 0.5 to 2 nm, and an average diameter (average particle size) of a protruding portion (grown particle) of the rough structure is 5 to 10 nm, for instance.

Although the magnetic region 32a in the track servo signal region TS and the magnetic region 32c in the user data region YD are made of the same magnetic material, in this embodiment the magnetic region 32a has greater coercive force than the magnetic region 32c, because of the pinning effect of the rough surface region 41a. As shown in FIG. 15 for example, the coercive force $Hc_1$ of the magnetic region 32a can be made greater than the coercive force $Hc_2$ of the magnetic region 32c.

FIGS. 21(a) through 23(b) depict a manufacturing method of the magnetic disk X4. These drawings represent the same cross-section as FIG. 20, and show the progress of the manufacturing process of the magnetic disk X4.

To manufacture the magnetic disk X4, firstly a resist pattern 45 is formed on the disk substrate 41 as shown in FIG. 21(a). In this embodiment, the resist pattern 45 has a pattern shape according to the user data region YD of the recording layer 32.

Proceeding to FIG. 21(b), the rough surface region 41a is formed on the disk substrate 41. To form the rough surface region 41a, a dry etching process may be performed on the disk substrate 41 utilizing the resist pattern 45 as the mask. An Ar gas may be employed as the etching gas.

Then the resist pattern 45 is removed, after which the magnetic film 36, which is a perpendicular magnetic film, is formed as shown in FIG. 21(c). To form the magnetic film 36, a sputtering process may be performed to deposit a predetermined magnetic material on the disk substrate 41. In this process, the magnetic film 36 is formed in an as-depo state, in which the magnetic film 36 is randomly and generally uniformly magnetized in a vertical direction.

Proceeding to FIG. 21(d), the resist pattern 37 is formed on the magnetic film 36. An etching process is then performed on the magnetic film 36, utilizing the resist pattern 37 as the mask, as shown in FIG. 22(a). At this stage, the magnetic regions 32a, 32c are formed in the as-depo state. After removal of the resist pattern 37, the non-magnetic material 38 is deposited as shown in FIG. 22(b). Proceeding to FIG. 22(c), an excessive portion of the non-magnetic material 38 is removed. At this stage, the non-magnetic region 32b and the non-magnetic region 32B (not shown) are formed. Then as shown in FIG. 22(d), the cover layer 34 is formed. Specific methods of such process are similar to those described referring to the third embodiment, from the formation of the resist pattern 37 to the formation of the cover layer 34.

Referring now to FIG. 23(a), a predetermined magnetic field Hr, which is stronger than the coercive force $Hc_1$ of the magnetic region 32a (hence also stronger than the coercive force $Hc_2$ of the magnetic region 32c) is collectively applied to the entire recording layer 32, to thereby magnetize the magnetic regions 32a and 32c in the same direction. The application of the magnetic field results in formation of the track servo information, including a plurality of magnetic regions 32a and a plurality of non-magnetic regions 32b magnetized in the same direction, in the track servo signal region TS.

The entire disk is then heated at a predetermined temperature, to thereby maintain the magnetizing direction of the magnetic region 32a, which has the greater coercive force $Hc_1$, while thermally relaxing the magnetic region 32c having the smaller coercive force $Hc_2$ thus turning the magnetic region 32c into the as-depo state. Throughout the foregoing process, the magnetic disk X4 including the track servo information in each track servo signal region TS in the respective information tracks 32A of the recording layer 32 can be obtained.

In the magnetic disk X4, as described referring to FIG. 23(a), collectively applying the magnetic field to the entire recording layer 32 enables magnetizing the magnetic region 32a in the same direction in the track servo signal region TS, which facilitates efficiently forming the track servo information. The magnetic disk X4 also eliminates the need to perform the AC erasion process described referring to the conventional magnetic disk 90, for turning the magnetic region 32c in the user data region YD into the as-depo state. This is because the process described referring to FIG. 23(b) enables turning the magnetic region 32c into the as-depo state by thermal relaxation, while maintaining the magnetizing direction of the magnetic region 32a, based on the difference in coercive force between the magnetic regions 32a and 32c. Thus, the magnetic disk X4 allows efficiently forming the track servo information, and efficiently bringing the magnetic region 32c in the user data region YD into the as-depo state. The magnetic disk X4, consequently, facilitates improving the manufacturing efficiency and reducing the manufacturing cost.

In the manufacturing method according to this embodiment, the non-magnetic material 38 that applies a predetermined amount of stress to the magnetic regions 32a, 32c may be deposited, in the process described referring to FIG. 22(b). As already stated regarding the third embodiment, a significant stress effect of a predetermined magnitude imposed by the non-magnetic material 38 (or the non-magnetic regions 32B, 32b made of the non-magnetic material 38) may contribute to making the coercive force $Hc_1$ of the magnetic region 32a greater than the coercive force $Hc_2$ of the magnetic region 32c.

In the manufacturing method according to this embodiment, a dry etching process may be performed with an Ar gas, after the removal of the resist pattern 37 and before the deposition of the non-magnetic material 38 as shown in FIG. 22(b), so as to roughen the sidewall of the magnetic regions 32a, 32c. As already stated regarding the third embodiment, roughening the sidewall of the magnetic regions may contribute to making the coercive force $Hc_1$ of the magnetic region 32a greater than the coercive force $Hc_2$ of the magnetic region 32c.

Figure 24:
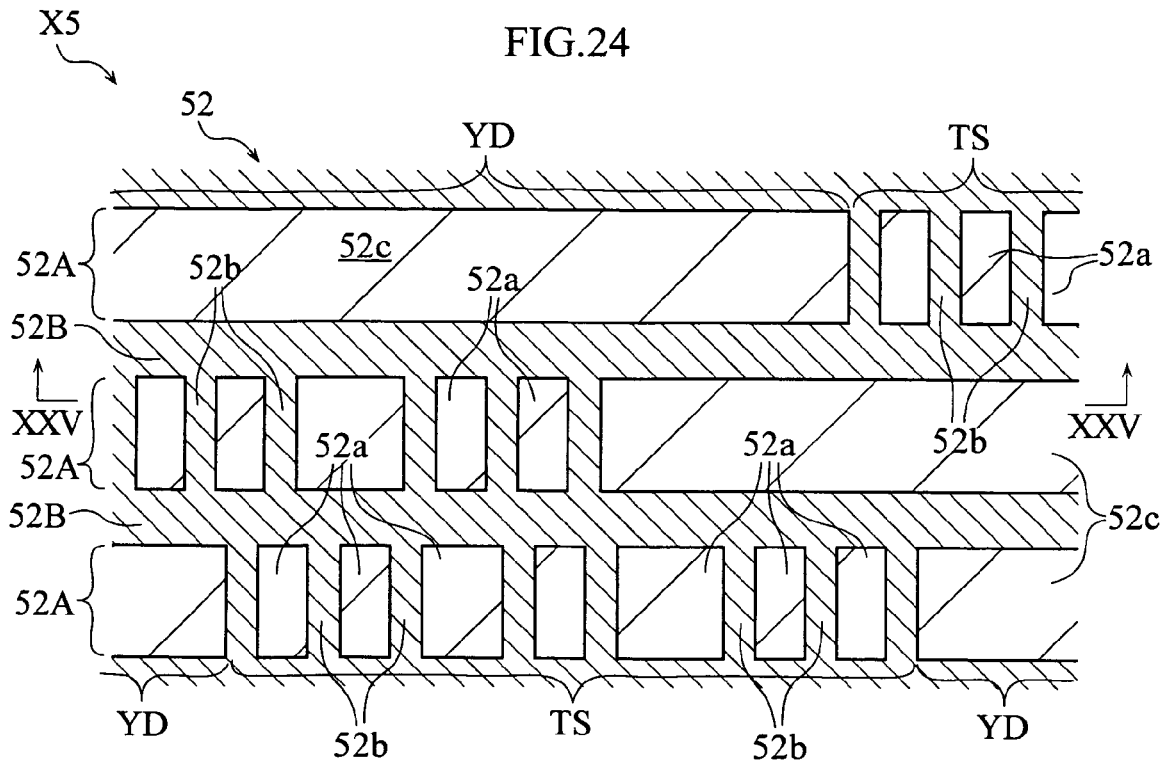
FIG. 24 is a fragmentary plan view showing a magnetic disk according to a fifth embodiment of the present invention.
Figure 25:
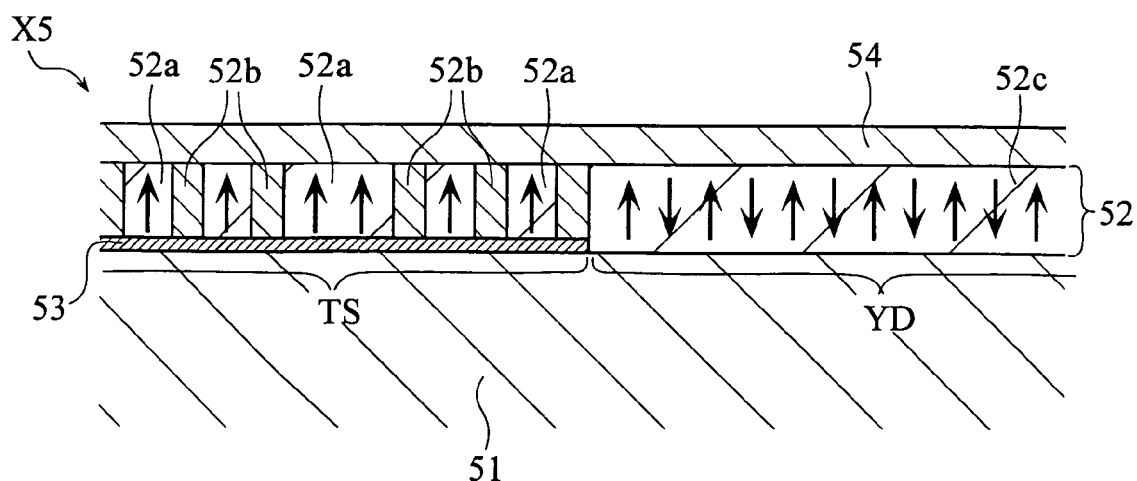
FIG. 25 is a cross-sectional view taken along the line XXV-XXV in FIG. 24.

FIGS. 24 and 25 depict a DT type magnetic disk X5, according to a fifth embodiment of the present invention. FIG. 24 is a fragmentary plan view of the magnetic disk X5, and FIG. 25 is a cross-sectional view taken along the line XXV-XXV in FIG. 24.

The magnetic disk X5 has a multilayer structure including a disk substrate 51, a recording layer 52, a heat dissipation layer 53 (not shown in FIG. 24), and a cover layer 54 (not shown in FIG. 24), and constitutes a magnetic recording medium capable of recording and reproducing information based on a heat-assisted magnetic recording system.

The disk substrate 51 primarily serves to secure sufficient rigidity of the magnetic disk X5, and may be made of an aluminum alloy, glass, or a polycarbonate resin.

The recording layer 52 includes, as shown in FIG. 24, a plurality of information tracks 52A and a plurality of non-magnetic regions 52B. The information tracks 52A are concentrically disposed on the disk substrate 51 around the rotation center of the magnetic disk X5. The information tracks 52A, a part of which is shown in FIG. 24, are respectively divided into a plurality of track servo signal regions Ts and a plurality of user data regions YD. The track servo signal regions TS respectively include a plurality of magnetic regions 52a and a plurality of non-magnetic regions 52b, such that the adjacent magnetic regions 52a are isolated from each other by the non-magnetic region 52b. The magnetic regions 52a respectively have what is known as perpendicular magnetic anisotropy, and are magnetized in the same direction. The coercive force $Hc_1$ of the magnetic region 52a is, for instance, 3 to 5 kOe in room temperature. The magnetic region 52a and the non-magnetic region 52b may be made of the materials cited referring to the magnetic region 12a and the non-magnetic region 12b of the first embodiment. The magnetic regions 52a and the non-magnetic regions 52b constitute track servo information. The user data region YD includes a magnetic region 52c, where user data is to be written, extending along the extending direction of the information track 52A. The magnetic region 52c is made of the same material as the magnetic region 52a having the perpendicular magnetic anisotropy, and is in so-called an "as-depo" state in which the region is randomly and generally uniformly magnetized in a vertical direction, before the user data is first written thereon. The coercive force $Hc_2$ of the magnetic region 52c is for instance 3 to 5 kOe in room temperature, which is equal to the coercive force $Hc_1$ of the magnetic region 52a. The non-magnetic regions 52B are interposed among the information tracks 52A, and made of the same non-magnetic material of the non-magnetic region 52b. The recording layer 52 thus configured has a thickness of 10 to 20 nm, for instance.

The heat dissipation layer 53 serves to transmit heat from the track servo signal region TS of the recording layer 52, more specifically from the magnetic region 52a, to the disk substrate 51, and has higher thermal conductivity than the disk substrate 51. The heat dissipation layer 53 is located in a region on the disk substrate 51 at least corresponding to the track servo signal region TS, except a region corresponding to the user data region YD of the recording layer 52 (for example, all over the disk substrate 51 except the region corresponding to the user data region YD of the recording layer 52). The heat dissipation layer 53 is made of a predetermined highly heat-conductive material, and has a thickness of, for instance, 5 to 30 nm. Suitable highly heat-conductive materials include a metal selected from a group consisting of Ag, Al, Au and Pt, or an alloy containing such metal.

The cover layer 54 serves to physically and chemically protect the recording layer 52 and the heat dissipation layer 53 from external objects, and may be made of SiN, $SiO_2$, or diamond-like carbon.

The multilayer structure of the magnetic disk X5, which includes the disk substrate 51, the recording layer 52, the heat dissipation layer 53 and the cover layer 54, may further include an additional layer if necessary.

When recording information on the magnetic disk X5, the magnetic head (not shown) applies the recording magnetic field, thus to create a plurality of recording marks (magnetic domains), alternately magnetized in opposite directions and serially aligned circumferentially of the disk, on the magnetic region 52c in the user data region YD in one of the information tracks 52A. During this process, since the information track 52A to which the magnetic field is sequentially applied for recording information and the adjacent information track 52A are isolated by the non-magnetic region 52B, a cross-write effect, which erases or degrades the recording mark in the adjacent information track 52A, can be prevented. The capability of preventing the cross-write effect is an advantageous feature of the magnetic disk in achieving a finer pitch of the tracks and higher recording density.

FIGS. 26(a) through 28(b) depict a manufacturing method of the magnetic disk X5. These drawings represent the same cross-section as FIG. 25, and show the progress of the manufacturing process of the magnetic disk X5.

To manufacture the magnetic disk X5, firstly a resist pattern 55 is formed on the disk substrate 51 as shown in FIG. 26(a). In this embodiment, the resist pattern 55 has a pattern shape according to the user data region YD of the recording layer 52.

Proceeding to FIG. 26(b), the heat dissipation layer 53 is formed on the disk substrate 31. To form the heat dissipation layer 53, a sputtering process may be employed to deposit a predetermined highly heat-conductive material on the disk substrate 51.

Then the resist pattern 55 is removed, after which a magnetic film 56, which is a perpendicular magnetic film, is formed as shown in FIG. 26(c). To form the magnetic film 56, a sputtering process may be performed to deposit a predetermined magnetic material on the disk substrate 51, so as to cover the heat dissipation layer 53. In this process, the magnetic film 56 is formed in an as-depo state, in which the magnetic film 56 is randomly and generally uniformly magnetized in a vertical direction.

Figure 26:
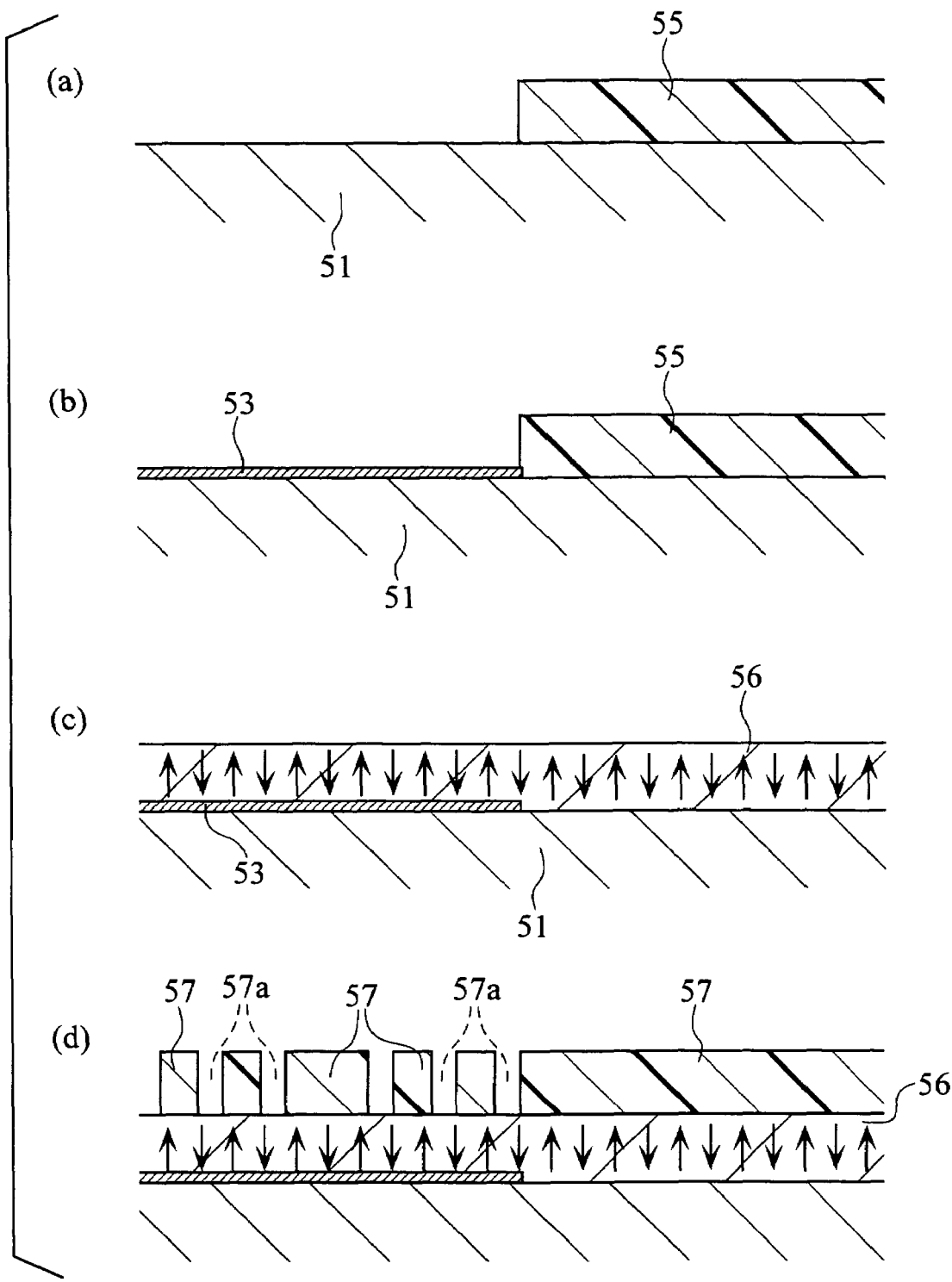
FIGS. 26(a) to 26(d) are cross-sectional views progressively showing a manufacturing process of the magnetic disk according to the fifth embodiment.

Proceeding to FIG. 26(*d*), a resist pattern 57 is formed on the magnetic film 56. The resist pattern 57 includes openings 57*a* located according to the pattern of the non-magnetic region 52*b*. The resist pattern 57 also includes openings (not shown) located according to the pattern of the non-magnetic region 52B.

Figure 27:
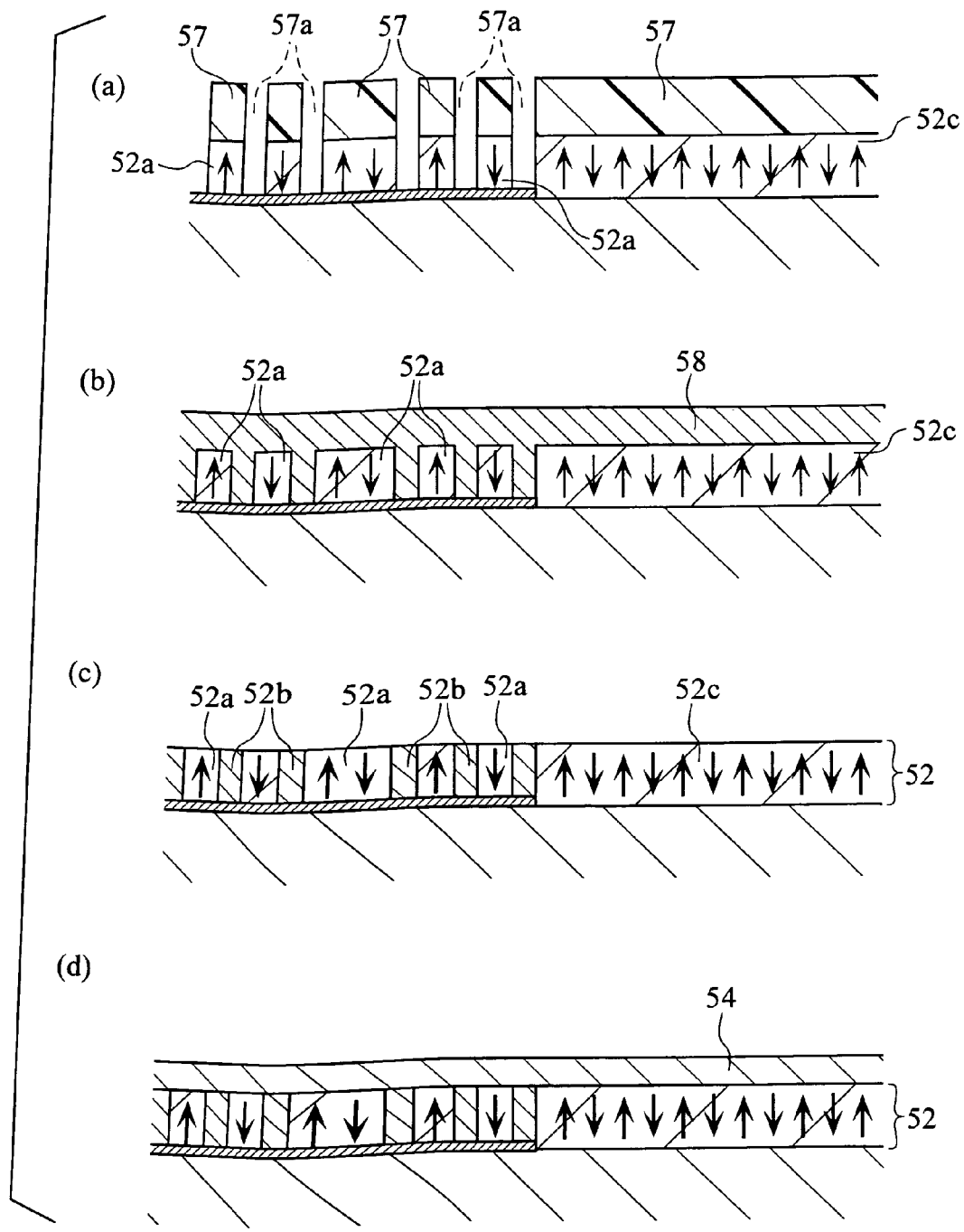
FIGS. 27(a) to 27(d) are cross-sectional views showing the manufacturing process subsequent to FIG. 26(d)

An etching process is then performed on the magnetic film 56, utilizing the resist pattern 57 as the mask, as shown in FIG. 27(*a*). In this process, a dry etching process that employs an Ar gas may be performed. At this stage, the magnetic regions 52*a*, 52*c* are formed in the as-depo state.

After removal of the resist pattern 57, a non-magnetic material 58 is deposited as shown in FIG. 27(*b*). Specifically, a sputtering process may be employed to deposit the non-magnetic material stated referring to the non-magnetic region 52*b*, so as to fill at least the grooves among the magnetic regions.

Proceeding to FIG. 27(*c*), an excessive portion of the non-magnetic material 58 is removed, for example by mechanical polishing. At this stage, the non-magnetic regions 52*b* and 52B are formed.

As shown in FIG. 27(*d*), the cover layer 54 is then formed on the recording layer 52, for example by sputtering to deposit a predetermined material on the recording layer 52.

Figure 28:
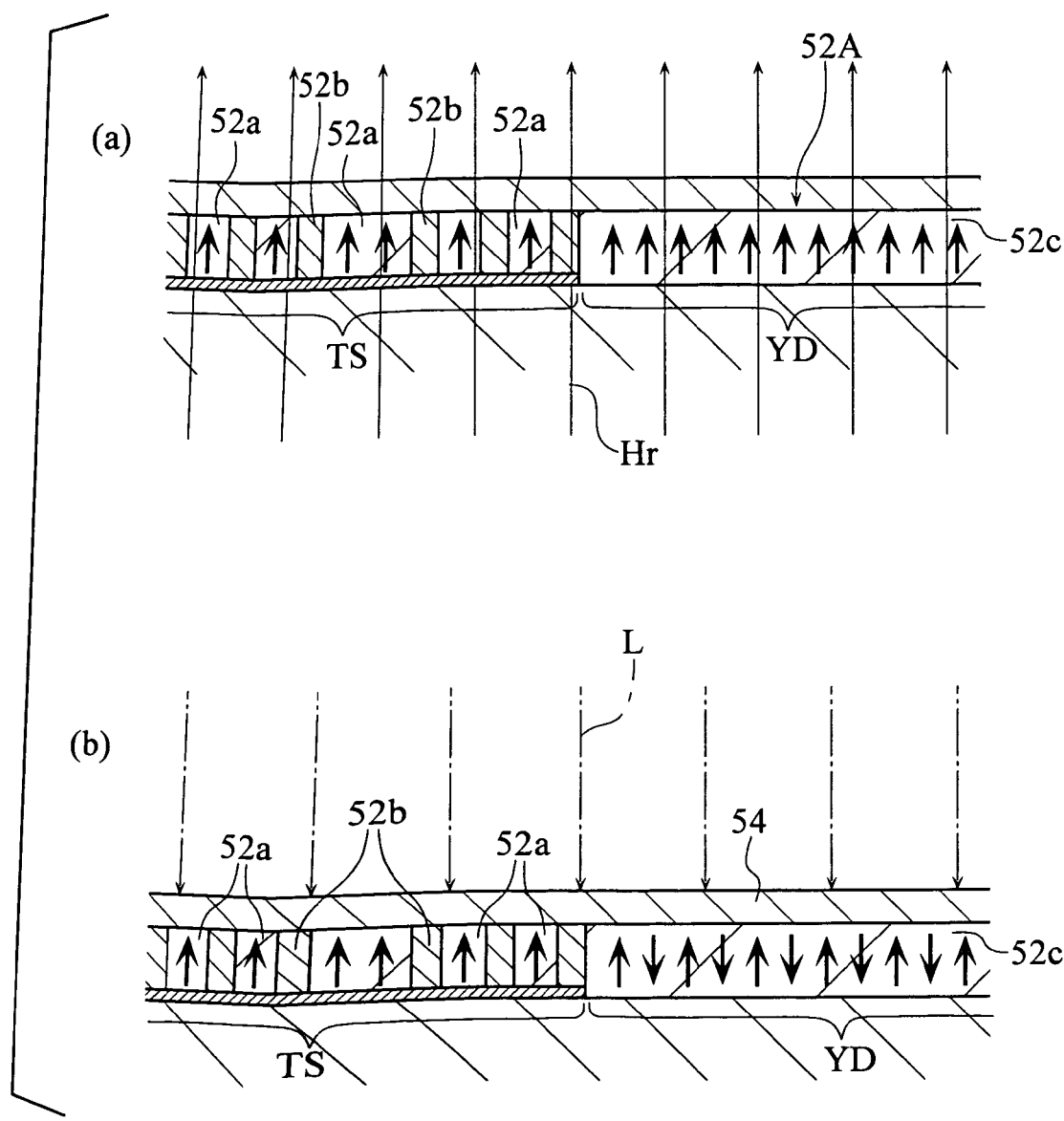
FIGS. 28(a) and 28(b) are cross-sectional views showing the manufacturing process subsequent to FIG. 27(d)

Referring now to FIG. 28(*a*), a predetermined magnetic field Hr, which is stronger than the coercive force $Hc_1$, $Hc_2$ of the magnetic regions 52*a* and 52*c*, is collectively applied to the entire magnetic disk X5 or the recording layer 52, to thereby magnetize the magnetic regions 52*a* and 52*c* in the same direction. The application of the magnetic field results in formation of the track servo information, including a plurality of magnetic regions 52*a* and a plurality of non-magnetic regions 52*b* magnetized in the same direction, in the track servo signal region TS.

Proceeding to FIG. 28(*b*), the recording layer 52 is irradiated with a laser L of a predetermined power from the direction of the cover layer 54 such that the laser L sweeps all over the recording layer 52, to thereby maintain the magnetizing direction of the magnetic region 52*a*, and turn the magnetic region 52*c* into the as-depo state by thermal relaxation. In this embodiment, a bulk laser for a photomagnetic recording medium is employed as the laser emitter. The bulk laser can emit the laser L having a diameter that covers a plurality of information tracks 52A to the recording layer 52, thereby facilitating efficiently carrying out this process.

In the magnetic disk X5, the coercive force $Hc_1$ of the magnetic region 52*a* and the coercive force $Hc_2$ of the magnetic region 52*c* are substantially the same, under a same temperature. However, since the heat dissipation layer 53 to which the magnetic region 52*a* is joined on the side of the disk substrate 51 has higher thermal conductivity (hence higher heat dissipation efficiency) than the disk substrate 51 to which the magnetic region 52*c* is joined, when the recording layer is irradiated with the laser from the direction of the cover layer 54 (opposite to the disk substrate 51) the magnetic region 52*c* in the irradiated region gains a higher temperature than the magnetic region 52*a* in the irradiated region, because of the difference in heat dissipation efficiency or heat diffusing performance between the heat dissipation layers 53 and the disk substrate 51. The difference in temperature increase, in turn, makes the coercive force $Hc_2$ of the magnetic region 52*c* in the irradiated region smaller than the coercive force $Hc_2$ of the magnetic region 52*a* in the irradiated region. Therefore, the process of FIG. 28(*b*) enables maintaining the magnetization direction of the magnetic region 52*a* of the lower temperature and having the greater coercive force, while turning the magnetic region 52*c* of the higher temperature and having the smaller coercive force into the as-depo state by thermal relaxation, in the irradiated region.

Throughout the foregoing process, the magnetic disk X5 including the track servo information in each track servo signal region TS in the respective information tracks 52A of the recording layer 52 can be obtained.

In the magnetic disk X5, as described referring to FIG. 28(*a*), collectively applying the magnetic field to the entire recording layer 52 enables magnetizing the magnetic region 52*a* in the same direction in the track servo signal region TS, which facilitates efficiently forming the track servo information. The magnetic disk X5 also eliminates the need to perform the AC erasion process described referring to the conventional magnetic disk 90, for turning the magnetic region 52*c* in the user data region YD into the as-depo state. This is because the process described referring to FIG. 28(*b*) enables turning the magnetic region 52*c* into the as-depo state by thermal relaxation, while maintaining the magnetizing direction of the magnetic region 52*a*, based on the difference in heat dissipation efficiency or heat diffusing performance between the heat dissipation layer 53 to which the magnetic region 52*a* is jointed and the disk substrate 51 to which the magnetic region 52*c* is joined. Thus, the magnetic disk X5 allows efficiently forming the track servo information, and efficiently bringing the magnetic region 52*c* in the user data region YD into the as-depo state. The magnetic disk X5, consequently, facilitates improving the manufacturing efficiency and reducing the manufacturing cost.

Figure 29:
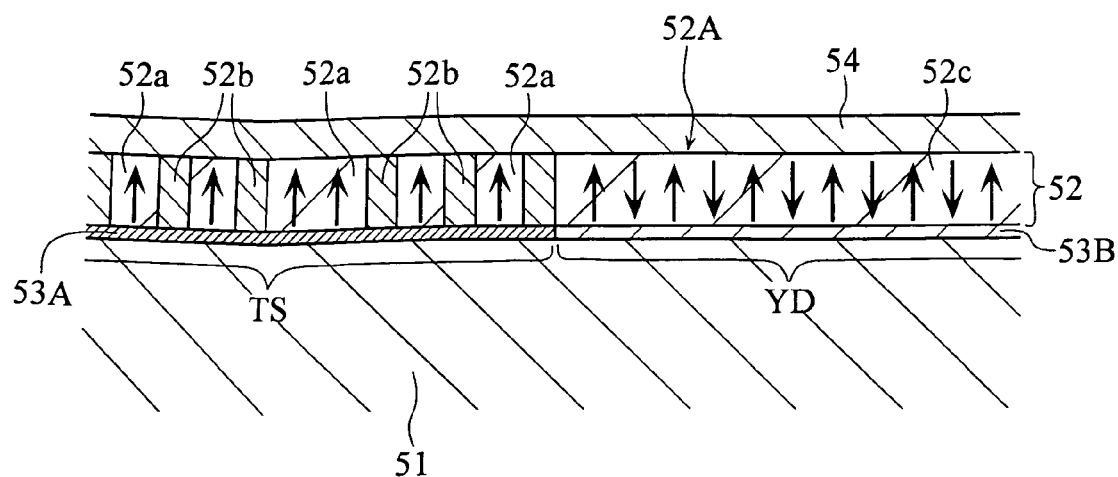
FIG. 29 is a fragmentary cross-sectional view circumferentially taken, showing a magnetic disk according to a first variation from the fifth embodiment.

In the magnetic disk X5, heat dissipation layers 53A, 53B may be provided as shown in FIG. 29, instead of providing the heat dissipation layer 53. The heat dissipation layer 53A, which serves to transmit heat from the track servo signal region TS of the recording layer 52, more specifically from the magnetic region 52*a*, to the disk substrate 51, has higher thermal conductivity than the disk substrate 51 and is interposed at least between the magnetic region 52*a* in the track servo signal region TS and the disk substrate 51. On the other hand, the heat dissipation layer 53B, which serves to transmit heat from the magnetic region 52*c* in the user data region YD of the recording layer 52 to the disk substrate 51, has thermal conductivity higher than that of the disk substrate 51 but lower than that of the heat dissipation layer 53A, and is interposed at least between the magnetic region 52*c* in the user data region YD and the disk substrate 51.

Even when the magnetic disk X5 is thus constructed, irradiating the recording layer 52 with a laser L of a predetermined power from the direction of the cover layer 54 such that the laser L sweeps all over the recording layer 52, in the process described referring to FIG. 28(*b*), enables maintaining the magnetizing direction of the magnetic region 52*a*, and turning the magnetic region 52*c* into the as-depo state by thermal relaxation. In the magnetic disk X5 shown in FIG. 29, the coercive force $Hc_1$ of the magnetic region 52*a* and the coercive force $Hc_2$ of the magnetic region 52*c* are substantially the same, under a same temperature. However, since the heat dissipation layer 53A to which the magnetic region 52*a* is joined on the side of the disk substrate 51 has higher thermal conductivity (hence higher heat dissipation efficiency) than the heat dissipation layer 53B to which the magnetic region 52*c* is joined on the side of the disk substrate 51, when the recording layer is irradiated with the laser from the direction of the cover layer 54 (opposite to the disk substrate 51) the magnetic region 52*c* in the irradiated region gains a higher temperature than the magnetic region 52*a* in the irradiated region, because of the difference in heat dissipation efficiency or heat diffusing performance between the heat dissipation layers 53A and 53B. The difference in temperature increase, in turn, makes the coercive force $Hc_2$ of the magnetic region 52c in the irradiated region smaller than the coercive force $Hc_1$ of the magnetic region 52a in the irradiated region. Therefore, even when the magnetic disk X5 is configured as shown in FIG. 29, the process described referring to FIG. 28(b) enables maintaining the magnetization direction of the magnetic region 52a of the lower temperature and having the greater coercive force $Hc_1$, while turning the magnetic region 52c of the higher temperature and having the smaller coercive force $Hc_2$ into the as-depo state by thermal relaxation, in the irradiated region.

Figure 30:
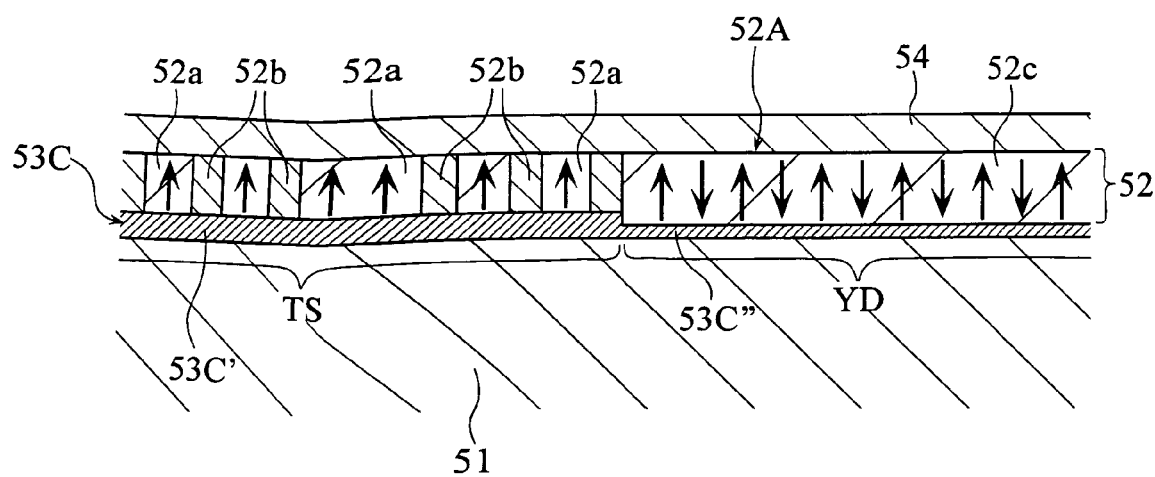
FIG. 30 is a fragmentary cross-sectional view circumferentially taken, showing a magnetic disk according to a second variation from the fifth embodiment.
Figure 31:
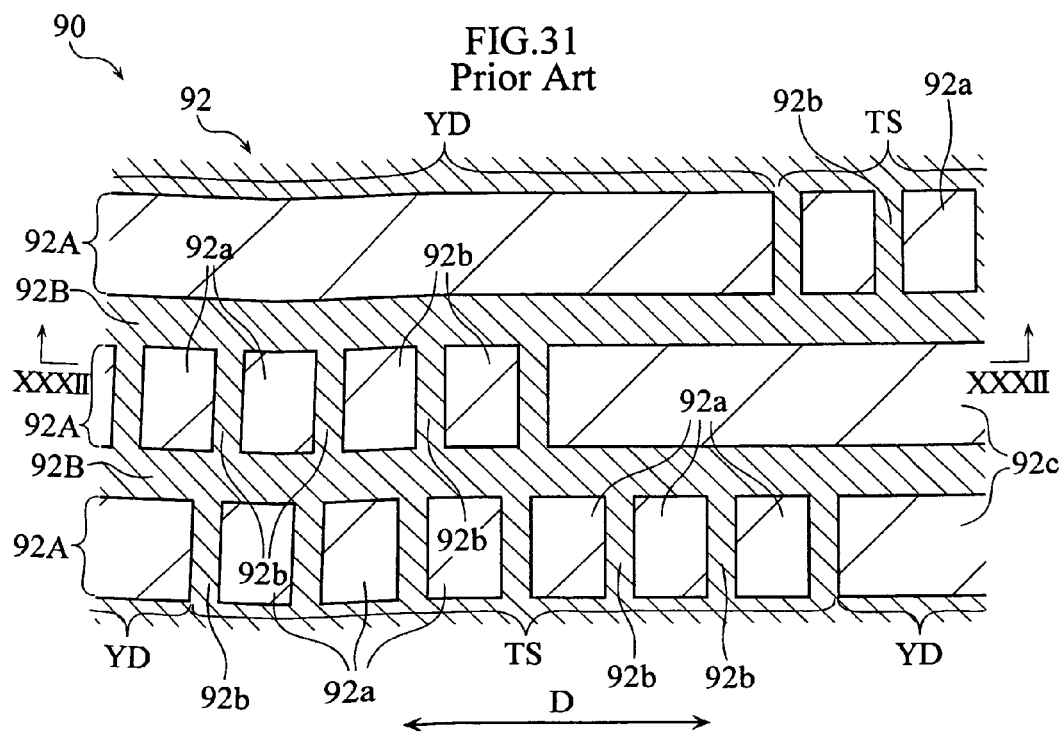
FIG. 31 is a fragmentary plan view showing a conventional DT type magnetic disk.
Figure 32:
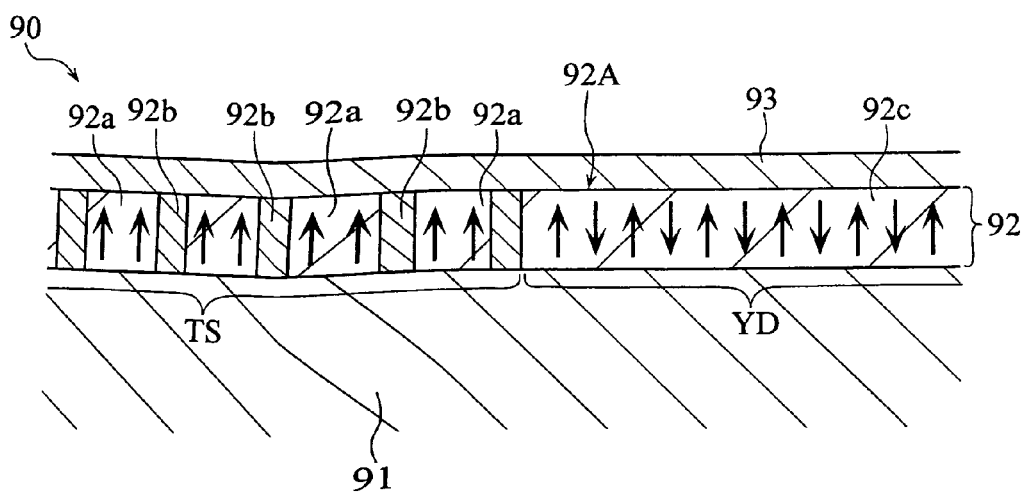
FIG. 32 is a cross-sectional view taken along the line XXXII-XXXII in FIG. 31.
Figure 33:
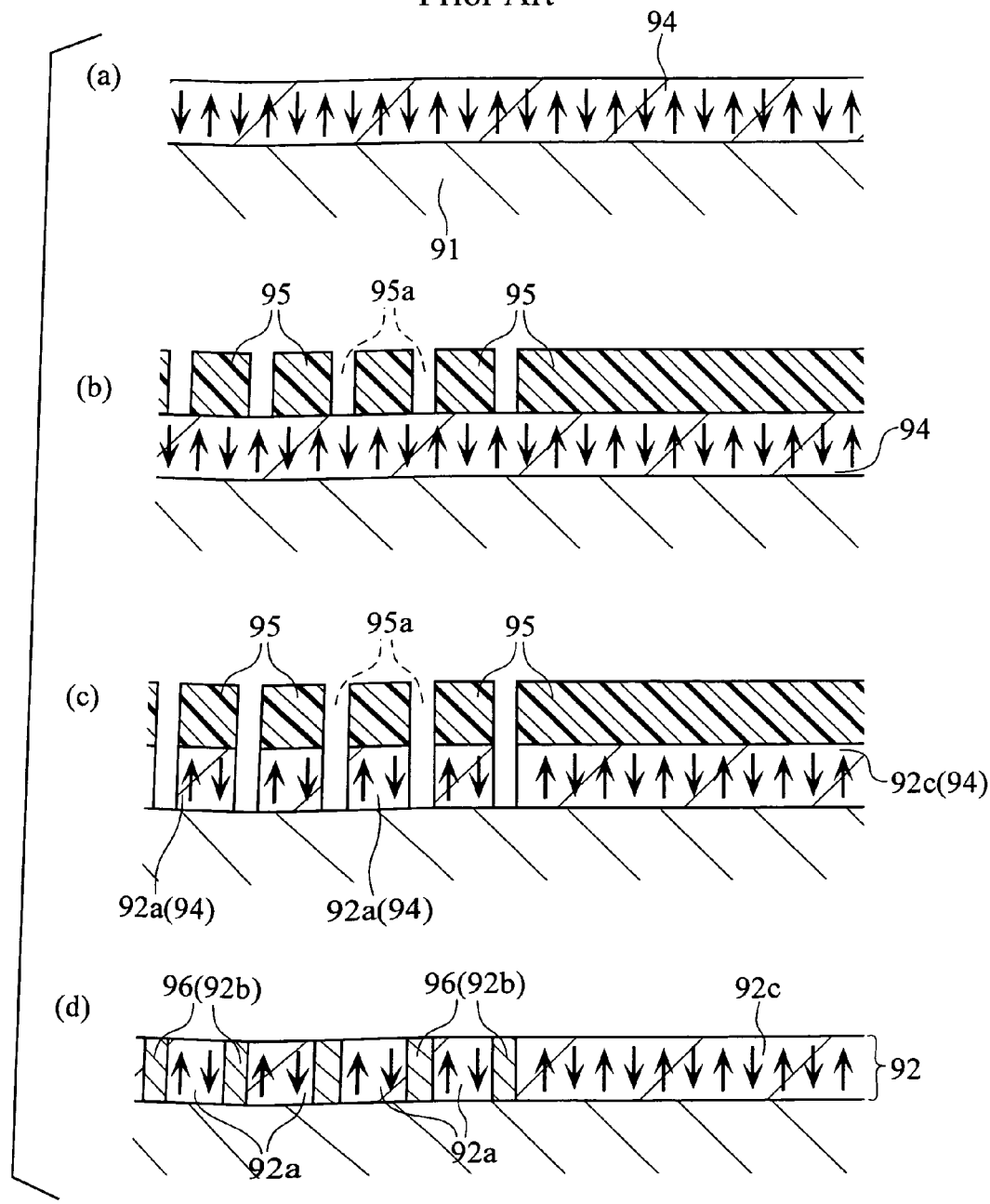
FIGS. 33(a) to 33(d) are progressively showing a manufacturing method of the conventional magnetic disk shown in FIG. 31.
Figure 34:
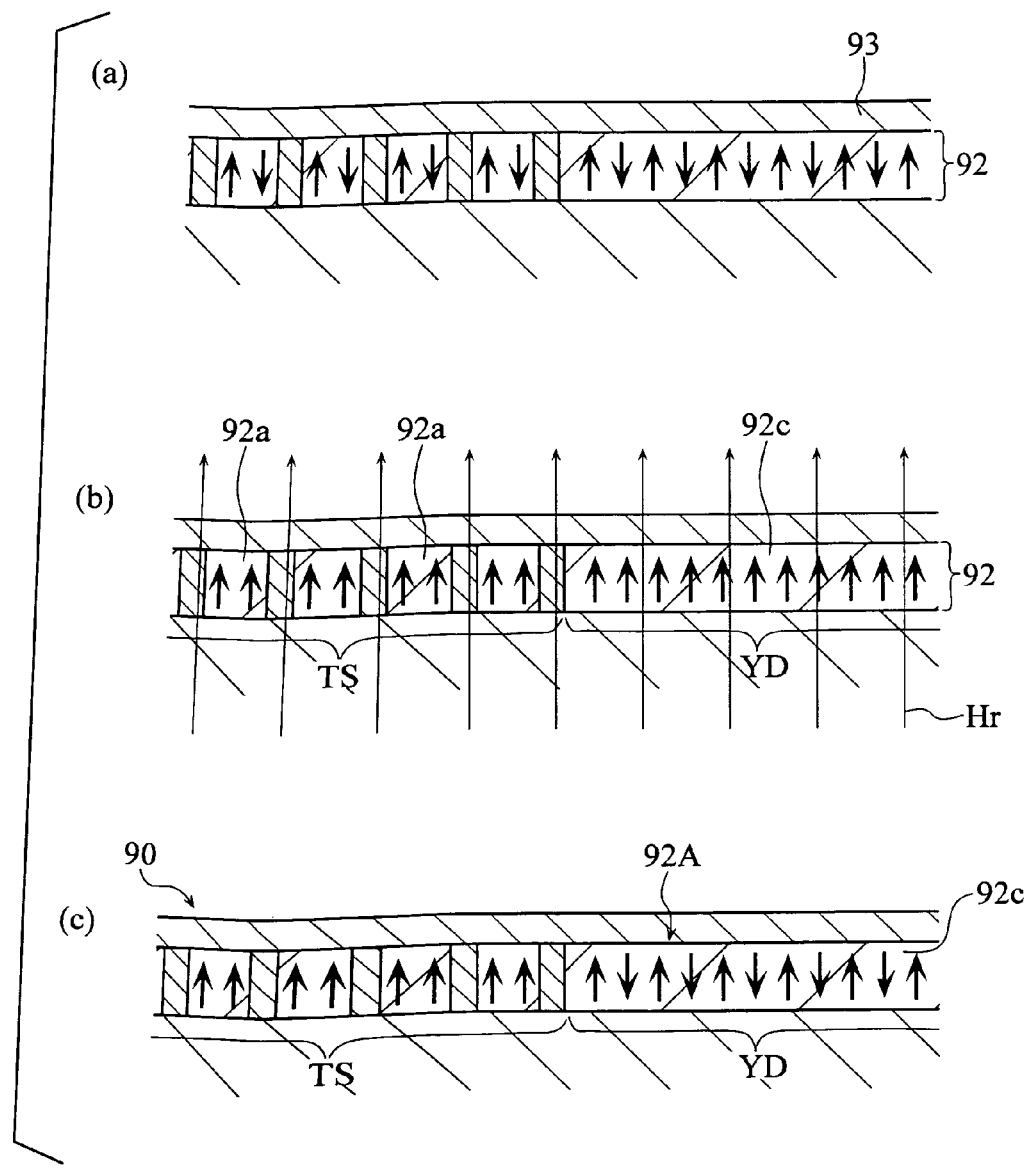
FIGS. 34(a) to 34(c) are cross-sectional views showing the manufacturing process subsequent to FIG. 33(d).

In the magnetic disk X5, a heat dissipation layer 53C may be provided as shown in FIG. 30, instead of providing the heat dissipation layer 53. The heat dissipation layer 53C has higher thermal conductivity than the disk substrate 51, and includes a thicker portion 53C' and a thinner portion 53C" that are continuously formed. The thicker portion 53C' serves to transmit heat from the track servo signal region TS of the recording layer 52, more specifically from the magnetic region 52a, to the disk substrate 51, and is interposed at least between the magnetic region 52a in the track servo signal region TS and the disk substrate 51. On the other hand, the thinner portion 53C" serves to transmit heat from the magnetic region 52c in the user data region YD of the recording layer 52 to the disk substrate 51, and is interposed at least between the magnetic region 52c in the user data region YD and the disk substrate 51.

Even when the magnetic disk X5 is thus constructed, irradiating the recording layer 52 with a laser L of a predetermined power from the direction of the cover layer 54 such that the laser L sweeps all over the recording layer 52, in the process described referring to FIG. 28(b), enables maintaining the magnetizing direction of the magnetic region 52a, and turning the magnetic region 52c into the as-depo state by thermal relaxation. In the magnetic disk X5 shown in FIG. 30, the coercive force $Hc_1$ of the magnetic region 52a and the coercive force $Hc_2$ of the magnetic region 52c are substantially the same, under a same temperature. However, since the thicker portion 53C' to which the magnetic region 52a is joined on the side of the disk substrate 51 has higher thermal conductivity (hence higher heat dissipation efficiency) than the thinner portion 53C" to which the magnetic region 52c is joined on the side of the disk substrate 51, when the recording layer is irradiated with the laser from the direction of the cover layer 54 (opposite to the disk substrate 51) the magnetic region 52c in the irradiated region gains a higher temperature than the magnetic region 52a in the irradiated region, because of the difference in heat dissipation efficiency or heat diffusing performance between the thicker portion 53C' and the thinner portion 53C". The difference in temperature increase, in turn, makes the coercive force $Hc_2$ of the magnetic region 52c in the irradiated region smaller than the coercive force $Hc_1$ of the magnetic region 52a in the irradiated region. Therefore, even when the magnetic disk X5 is configured as shown in FIG. 30, the process described referring to FIG. 28(b) enables maintaining the magnetization direction of the magnetic region 52a of the lower temperature and having the greater coercive force $Hc_1$, while turning the magnetic region 52c of the higher temperature and having the smaller coercive force $Hc_2$ into the as-depo state by thermal relaxation, in the irradiated region.

The invention claimed is:

1. A magnetic recording medium rotated about a rotation center for recording information, the medium comprising:
   a substrate; and
   a recording layer formed on the substrate;
   the recording layer being provided with a plurality of parallel information tracks extending around the rotation center, and with non-magnetic regions interposed between adjacent information tracks, each of the information tracks including a track servo signal region and a user data region;
   the track servo signal region being provided with a plurality of first magnetic regions aligned in a track extending direction, and with non-magnetic regions interposed between adjacent first magnetic regions;
   the user data region including a second magnetic region extending in the track extending direction; and
   the first magnetic region and the second magnetic region having different coercive forces;
   a minutely rough structure layer interposed between the substrate and the first magnetic region, or between the substrate and the second magnetic region.

2. The magnetic recording medium according to claim 1, wherein the coercive force of the second magnetic region is greater than the coercive force of the first magnetic region.

3. A method of manufacturing the magnetic recording medium according to claim 2, the method comprising the step of applying a magnetic field collectively to both the first magnetic region and the second magnetic region for magnetizing the first magnetic region in a same direction, the applied magnetic field being stronger than the coercive force of the first magnetic region but weaker than the coercive force of the second magnetic region.

4. The magnetic recording medium according to claim 1, wherein the coercive force of the first magnetic region is greater than the coercive force of the second magnetic region.

5. The magnetic recording medium according to claim 1, wherein the substrate includes a rough surface region, and one of the first magnetic region and the second magnetic region is provided on the rough surface region.

6. The magnetic recording medium according to claim 1, wherein the first magnetic region includes a roughened sidewall.

7. The magnetic recording medium according to claim 1, wherein the first magnetic region and the second magnetic region are made of a magnetic material of a same composition.

8. A magnetic recording medium rotated about a rotation center for recording information, the medium comprising:
   a substrate; and
   a recording layer formed on the substrate;
   the recording layer being provided with a plurality of parallel information tracks extending around the rotation center, and with non-magnetic regions interposed between adjacent information tracks, each of the information tracks including a track servo signal region and a user data region;
   the track servo signal region being provided with a plurality of first magnetic regions aligned in a track extending direction, and with non-magnetic regions interposed between adjacent first magnetic regions;
   the user data region including a second magnetic region extending in the track extending direction; and
   a minutely rough structure layer being interposed between the substrate and the first magnetic region, or between the substrate and the second magnetic region.

9. A magnetic recording medium rotated about a rotation center for recording information, the medium comprising:
- a substrate; and
- a recording layer formed on the substrate;
- the substrate including a rough surface region;
- the recording layer being provided with a plurality of parallel information tracks extending around the rotation center, and with non-magnetic regions interposed between adjacent information tracks, each of the information tracks including a track servo signal region and a user data region;
- the track servo signal region being provided with a plurality of first magnetic regions aligned in a track extending direction, and with non-magnetic regions interposed between adjacent first magnetic regions;
- the user data region including a second magnetic region extending in the track extending direction; and
- one of the first magnetic region and the second magnetic region being provided on the rough surface region.

10. A magnetic recording medium rotated about a rotation center for recording information, the medium comprising:
- a substrate; and
- a recording layer formed on the substrate;
- the recording layer being provided with a plurality of parallel information tracks extending around the rotation center, and with non-magnetic regions interposed between adjacent information tracks, each of the information tracks including a track servo signal region and a user data region;
- the track servo signal region being provided with a plurality of first magnetic regions aligned in a track extending direction, and with non-magnetic regions interposed between adjacent first magnetic regions;
- the user data region including a second magnetic region extending in the track extending direction; and
- the first magnetic region including a roughened sidewall.

11. A method of manufacturing the magnetic recording medium according to claim 10, the method comprising the step of:
- applying a magnetic field collectively to both the first magnetic region and the second magnetic region for magnetizing the first and the second magnetic regions in a same direction, the applied magnetic field being stronger than the coercive force of the first magnetic region; and
- heating the second magnetic region for thermal relaxation.

12. A magnetic recording medium rotated about a rotation center for recording information, the medium comprising:
- a substrate; and
- a recording layer formed on the substrate;
- the recording layer being provided with a plurality of parallel information tracks extending around the rotation center, and with non-magnetic regions interposed between adjacent information tracks, each of the information tracks including a track servo signal region and a user data region;
- the track servo signal region being provided with a plurality of first magnetic regions aligned in a track extending direction, and with non-magnetic regions interposed between adjacent first magnetic regions;
- the user data region including a second magnetic region extending in the track extending direction; and
- a portion at which the first magnetic region is joined on a side of the substrate has higher heat dissipation efficiency than a portion at which the second magnetic region is joined on a side of the substrate.

13. The magnetic recording medium according to claim 12, further comprising a heat dissipation layer interposed between the substrate and the first magnetic region.

14. The magnetic recording medium according to claim 12, further comprising a first heat dissipation layer interposed between the substrate and the first magnetic region, and a second heat dissipation layer interposed between the substrate and the second magnetic region, wherein the first heat dissipation layer has greater thermal conductivity than the second heat dissipation layer.

15. The magnetic recording medium according to claim 12, further comprising a first heat dissipation layer interposed between the substrate and the first magnetic region, and a second heat dissipation layer interposed between the substrate and the second magnetic region, wherein the first heat dissipation layer is thicker than the second heat dissipation layer.

16. A method of manufacturing the magnetic recording medium according to claim 12, the method comprising the steps of: applying a magnetic field collectively to both the first and the second magnetic regions for magnetizing the first and the second magnetic regions in a same direction; and
- irradiating the recording layer with a laser from a side opposite to the substrate for thermal relaxation of the second magnetic region.

* * * * *